US008132356B2

(12) United States Patent
Gill

(10) Patent No.: US 8,132,356 B2
(45) Date of Patent: Mar. 13, 2012

(54) FISHING LURE MANUFACTURING METHOD

(76) Inventor: Andy T. Gill, Olathe, KS (US)

( * ) Notice: Subject to any disclaimer, the term of this patent is extended or adjusted under 35 U.S.C. 154(b) by 375 days.

(21) Appl. No.: 12/550,614

(22) Filed: Aug. 31, 2009

(65) Prior Publication Data

US 2009/0313877 A1  Dec. 24, 2009

Related U.S. Application Data

(63) Continuation-in-part of application No. 11/710,349, filed on Feb. 23, 2007, now Pat. No. 7,581,347.

(51) Int. Cl.
*A01K 99/00* (2006.01)
(52) U.S. Cl. ....................................................... 43/42.53
(58) Field of Classification Search ................. 43/42.53; 132/323
See application file for complete search history.

(56) References Cited

U.S. PATENT DOCUMENTS

| | | | |
|---|---|---|---|
| 1,538,909 A | 5/1925 | Shannon | |
| 1,609,209 A | 11/1926 | Schnell | |
| 1,044,151 A | 10/1927 | Rodgers | |
| 2,722,766 A | 11/1955 | Accetta | |
| 3,191,336 A | 6/1965 | Cordell, Jr. | |
| 3,429,066 A | 2/1969 | McClellan | |
| 3,440,757 A | 4/1969 | McClellan | |
| 3,449,853 A | 6/1969 | Shearer | |
| 3,750,321 A | 8/1973 | McClellan | |
| 3,831,307 A | 8/1974 | Pittman | |
| 4,094,087 A | 6/1978 | Carpenter | |
| 4,219,956 A | 9/1980 | Hedman | |
| 4,334,381 A | 6/1982 | Carver et al. | |
| 4,367,607 A | 1/1983 | Hedman | |
| 4,437,257 A * | 3/1984 | Kluge | 43/42.45 |
| 4,530,179 A | 7/1985 | Larew | |
| 4,640,041 A | 2/1987 | Stanley | |
| 4,841,665 A | 6/1989 | McGahee | |
| 5,081,786 A * | 1/1992 | Cobb | 43/44.89 |
| 5,117,573 A | 6/1992 | Semler | |
| D329,487 S | 9/1992 | Pruiksma | |
| D330,244 S | 10/1992 | Pruiksma | |
| 5,175,955 A | 1/1993 | Wilson et al. | |
| 5,182,876 A | 2/1993 | Lewis | |
| 5,216,830 A | 6/1993 | Brott, II | |
| 5,220,743 A | 6/1993 | McClellan | |
| 5,231,786 A | 8/1993 | Hughes | |
| 5,335,443 A | 8/1994 | Grigsby, Jr. | |
| 5,548,920 A | 8/1996 | Peddycoart | |
| 5,551,185 A | 9/1996 | Reed | |
| 5,664,364 A | 9/1997 | Clark | |
| 5,725,892 A * | 3/1998 | Gibbs | 425/577 |

(Continued)

*Primary Examiner* — David Parsley
*Assistant Examiner* — Danielle Clerkley
(74) *Attorney, Agent, or Firm* — Law Office of Mark Brown LLC; Mark Brown

(57) ABSTRACT

A fishing lure manufacturing method is provided which includes automated and manual manufacturing methods for forming liquid plastic material into a lure having an embedded reinforcement. The method includes a rigid mold with a relief of the fishing lure to be created, and a rigid head pin and two rigid tail pins within the mold for holding an elongated reinforcement therein. A plurality of reliefs are arranged adjacent to one another in a mold. Reinforcement is strung between reliefs and around the pins forming an elongated V-shaped reinforcement within the lure relief. The relief is filled with liquid bait material, and the material encapsulates the reinforcement integrating it in the lure body as the material cures. The exposed reinforcement is cut away and the resulting lure has a head cavity at the base of the V-shaped reinforcement for alignment and insertion of a fishing hook.

4 Claims, 24 Drawing Sheets

U.S. PATENT DOCUMENTS

| | | |
|---|---|---|
| 5,784,827 A | 7/1998 | Jimenez, Jr. et al. |
| 5,890,317 A | 4/1999 | Hollomon |
| 5,899,015 A | 5/1999 | Link |
| 5,904,001 A | 5/1999 | Rabideau |
| 6,233,863 B1 | 5/2001 | Dotson |
| 6,240,672 B1 | 6/2001 | Huppert |
| 6,247,261 B1 * | 6/2001 | Kechriotis .......... 43/42.53 |
| 6,405,477 B1 | 6/2002 | Huppert |
| 6,519,895 B1 | 2/2003 | Bennett |
| D474,523 S | 5/2003 | Renosky |
| 6,772,553 B2 | 8/2004 | Phillips et al. |
| 2005/0235550 A1 | 10/2005 | Oelerich |
| 2006/0037230 A2 | 2/2006 | Oelerich et al. |
| 2007/0261289 A1 | 11/2007 | Hobbins |

* cited by examiner

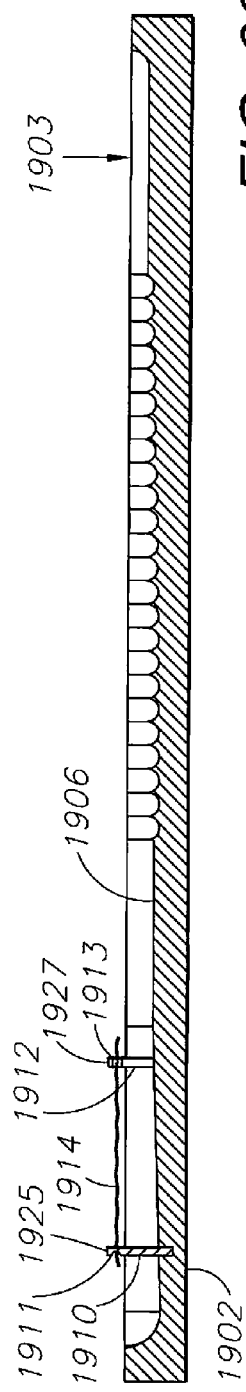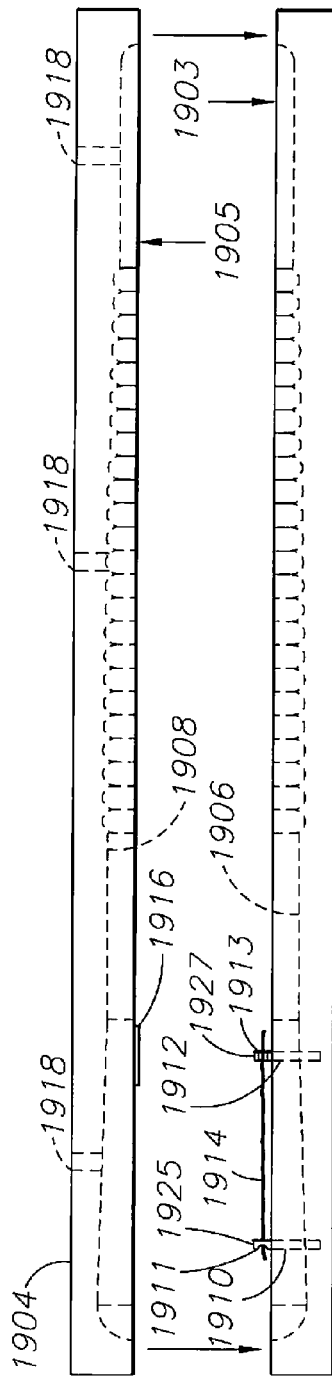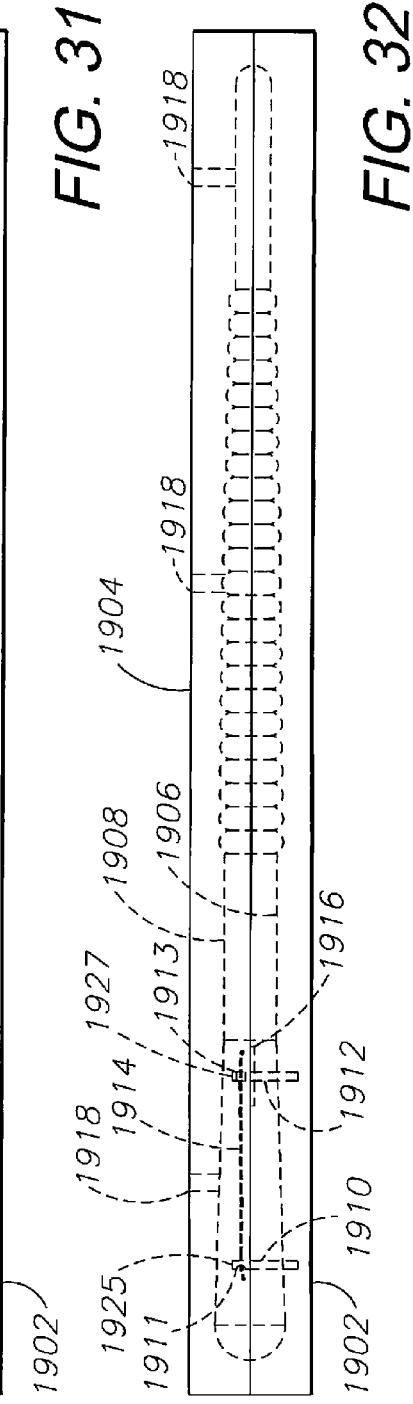

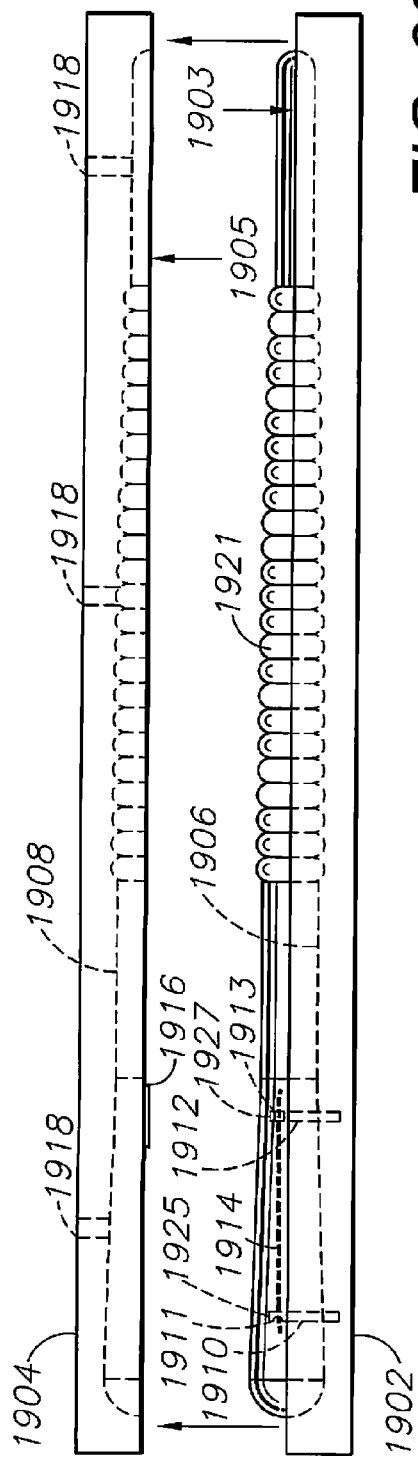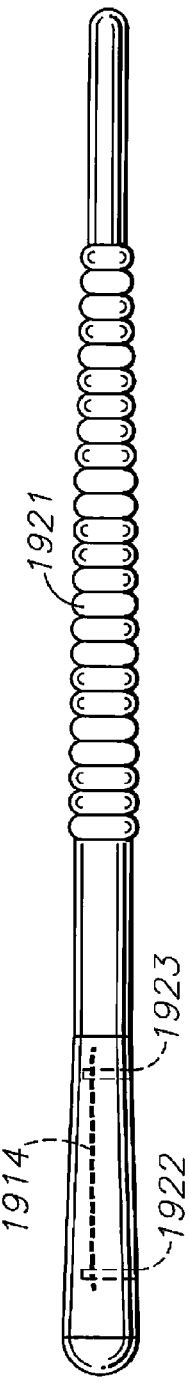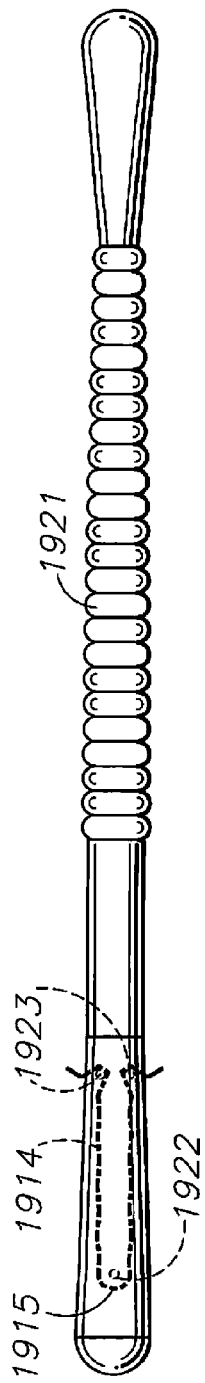
FIG. 33
FIG. 34
FIG. 35

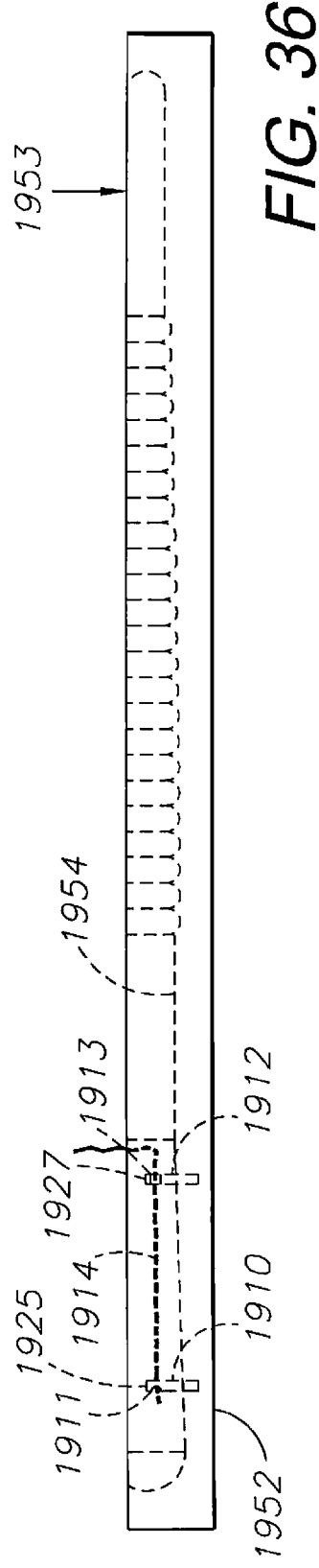
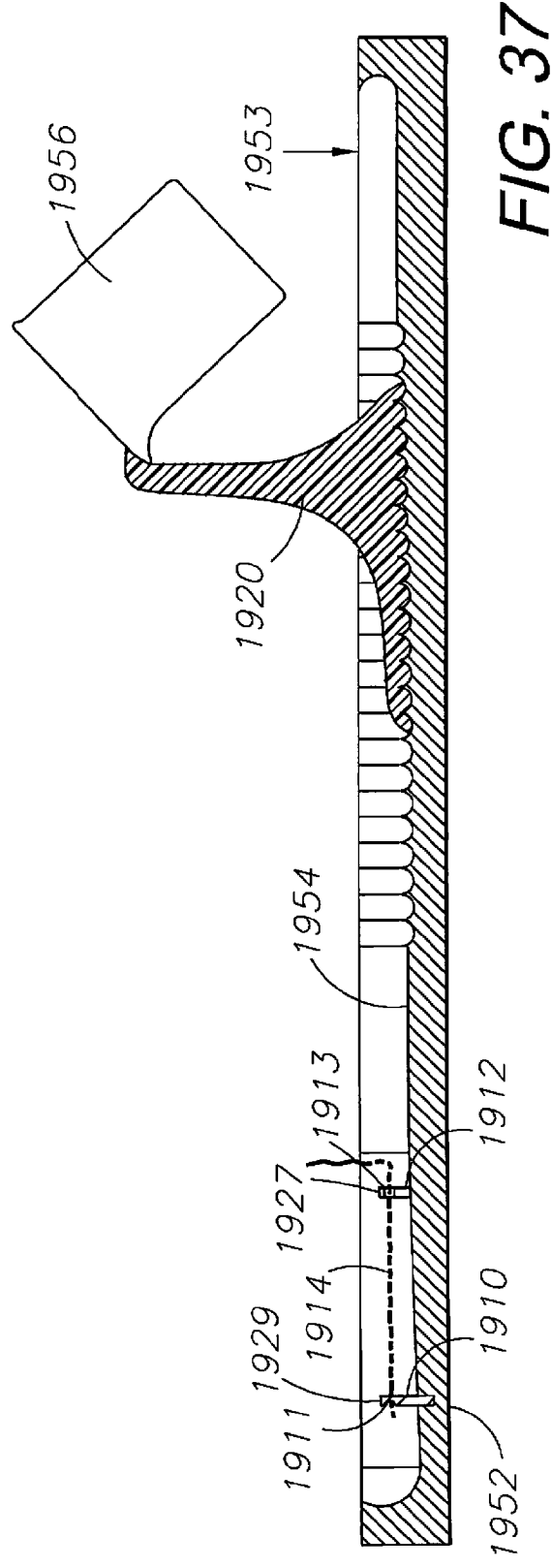

FISHING LURE MANUFACTURING METHOD

CROSS-REFERENCE TO RELATED APPLICATION

This application is a continuation-in-part of U.S. patent application Ser. No. 11/710,349, filed Feb. 23, 2007 now U.S. Pat. No. 7,581,347, which is incorporated herein by reference.

BACKGROUND OF THE INVENTION

1. Field of the Invention

The present invention relates generally to a lure manufacturing method, and in particular to a method of manufacturing fishing lures containing internal reinforcements.

2. Description of the Related Art

Various fishing bait devices are available within the fishing industry to attract fish and allow the reuse of the bait. The devices which are used include fishhooks with barbs or burrs that flare from the shank of the hook. These barbs are formed by peeling or shaving a portion of the shank to extend at a preferred angle. The barbs are formed to resist withdrawal of the lure or live bait that is mounted around the barbs. However, the barbs do not prevent the withdrawal of the lure or live bait. Often a fish will open its mouth and shake its head back and forth upon striking the barbed hook causing the fishhook to be withdrawn. Also, the barbs do not prevent the bait from sliding down the fishhook and obstructing the pointed end of the fishhook. It would be beneficial to have a lure or bait device that prevents the hook from being withdrawn or "spit out" by the fish and prevents the bait from sliding down the hook. In addition to spitting out the hook, fish can sometimes remove the bait from the hook without being captured.

Realistic lures and live bait are often utilized to attract fish onto a hook. Because of the realistic nature of many of these lures or live bait systems, fish can often remove the lure or bait from the line without being hooked. Some systems attempt to prevent the removal of the bait by utilizing an external locking member that has to be added to and fixedly secured to jigs and lures. These external locking members can detract from the realistic nature of the bait. In addition, barbs, the pointed-end of the fishhook or external locking members can become entangled in the weeds or embedded in the rocky ground. Some attempts to address this problem include incorporating a weedguard into the head of the locking members can become entangled in the weeds or embedded in the rocky ground. Some attempts to address this problem include incorporating a weedguard into the head of the jig. However, the addition of the weedguard created additional problems, including interfering with the fishhook or causing the jig to rotate horizontally allowing the fishhook to be removed from a fish's mouth. Other attempts to solve this problem included utilizing a "Texas rig" configuration, which uses jig configured with a fishhook point embedded in the body of the bait. However, these Texas rigs as well as conventional jigs allow the bait to slide down the hookshank and obstruct the hookpoint. It would be an advantage to use an internal reinforcing mechanism for bait systems which prevented removal of the bait, snagging of the jig or unwanted obstruction of the fishhook point.

Another problem with current bait systems is that it can be difficult and time consuming to change the attracting element. In some conditions, one type of bait can be more effective for attracting fish than another type of bait. This can be based on the type of fish, the environmental conditions and the underwater conditions. The fisher who begins the day under certain conditions may find that they change throughout the day and the lure or live bait system they began the day with is no longer effective. In this situation, the fisher may want to change the lure or bait being used. However, the time needed to change the bait system consumes valuable fishing time at a time when the fish may be striking. It would be advantageous to have an internally reinforced bait system which is easily changeable, producing the effectiveness of the jig at catching fish with the features of a weedguard system while preventing unwanted movement of the bait.

Prior art attempts to address these problems include the device shown in Huppert U.S. Pat. No. 6,405,477, which discloses a barbed stem which can be used to support live bait or artificial dressing. Peddycoart U.S. Pat. No. 5,548,920 discloses a locking mechanism for quick interchange. However, heretofore there has not been available a jig and bait system with the advantages and features of the present invention.

SUMMARY OF THE INVENTION

In the practice of the present invention, a jig and bait system is provided that satisfies the needs of providing an internally reinforced jig and bait system which is easily changeable with the effectiveness of the jig at catching fish and the features of a weedless system, which prevents the unwanted removal or movement of the bait. The jig and bait system includes a body connected to a bait keeper and a neck. The body and neck could be comprised of various types of materials such as lead, bismuth, plastic or other material types. The neck extends outwardly for securing a skirt and a fishhook. The skirt at least partially covers the fishhook. Optionally, the jig and bait system may include a latch for retaining a fish and a reinforcing filament.

A lure manufacturing method is provided that creates an internally reinforced lure that has a cavity for proper alignment and insertion of a fishing hook making it easier to place a hook in the bait and making it harder for the lure to slide off of the hook. The manufacturing method includes providing a rigid mold having a relief corresponding to a lure to be formed. A rigid head pin and a pair of rigid tail pins are located within the relief and adapted for supporting reinforcement that is threaded among the pins and between adjacent reliefs. The reinforcement forms an elongated V-shape within the lure. The relief is filled with liquid bait material encapsulating the reinforcement therein. After the bait material cures, the exposed reinforcement is cut and the lure is removed from the mold leaving a cavity at the base of the V-shaped reinforcement where the head pin was located.

BRIEF DESCRIPTION OF THE DRAWINGS

FIG. 1a shows a top plan of the jig and bait system.

FIG. 2a shows a top plan of the elliptical body embodiment of the jig and bait system.

FIG. 17A shows a side elevation of an alternative multiple-hooked embodiment of the jib and bait system.

FIG. 20 shows a side elevation of an alternative reinforced artificial bait embodiment of the jig and bait system.

FIG. 21 shows another side elevation of the alternative reinforced artificial bait embodiment of the jig and bait system.

FIG. 30 is a cross-sectional view of the first mold taken along line 30 in FIG. 28A.

FIG. 31 is a left elevational view of a step in the process of making fishing lures where the first and second mold halves are closing.

FIG. 32 is a left elevational view of another step in the process of making lures where the mold is closed.

FIG. 33 is a left elevational view of another step in the process of making lures where a cured lure resides within the first mold.

FIG. 34 is a left elevational view of a cured lure.

FIG. 35 is a top plan view of a cured lure.

FIG. 36 is an elevational view of a step in an alternative process of making a fishing lure.

FIG. 37 is a cross-sectional view of the open mold embodying an alternative process of making fishing lures.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "outwardly" and "externally" refer to directions out and away from, respectively, the geometric center of the embodiment being described and designated parts thereof. Said terminology will include the words specifically mentioned, derivatives thereof and words of similar meaning.

II. Jig and Bait System 2

Figure 1:
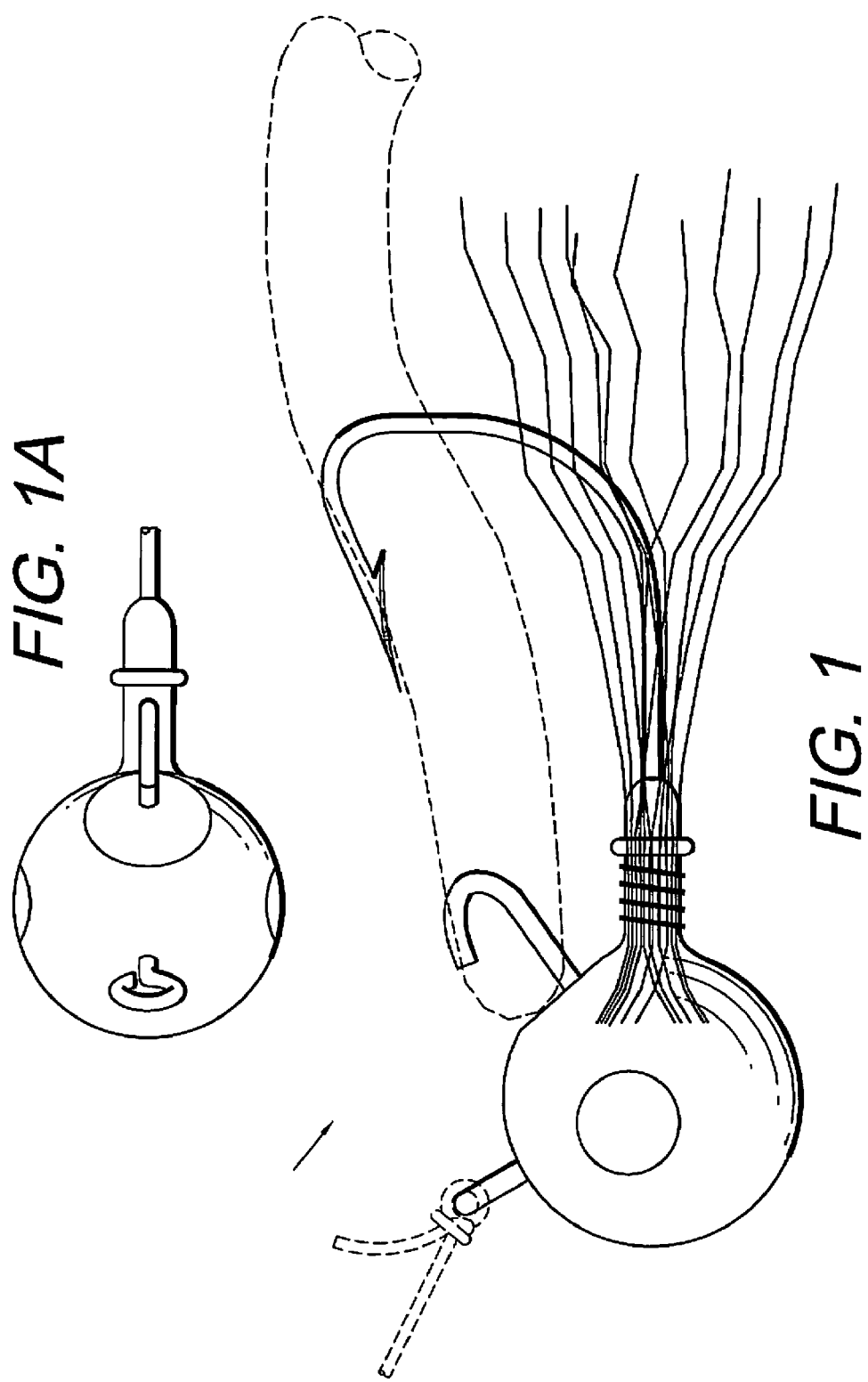
FIG. 1 shows a side elevation of a jig and bait system embodying the present invention.

Referring to the drawings in more detail, the reference numeral 2 generally designates a jig and bait system for attracting and capturing fish with bait 4 including a regular shaped body 10, a bait keeper 20, a neck 30, a fishhook 50 and a line connector 70. The present invention can be configured using various types of materials for lures and jigs including; jigs, spinnerbaits, buzzbaits, crankbaits, Texas rigs, inline spinners and other bait system configurations. FIG. 1 depicts the system 2 with: a round body 10 having an exterior surface 12, a top 14 and a bottom 16; a bait keeper 20 with a keeper proximate end 22 and a keeper distal end 24; a neck 30 with an annular collar 32, a neck proximate end 34 and a neck distal end 36; a fishhook 50 with a fishhook extension section 54, a fishhook curved return section 56 and a fishhook pointed distal end 58; and a line connector 70. As depicted in FIG. 1, the bait 4 is attached at the bait keeper 20 in addition to being secured on the fishhook 50. The bait keeper 20, which can be imbedded into the body 10 or molded integrally with the body, secures and aligns the bait 4 with the fishhook 50 and allows the bait 4 to be changed rapidly while maintaining the same jig and bait system. To change the bait 4 the user simply unhooks the bait from the fishhook 50 and removes the bait from the bait keeper 20. In this manner the user of such a system can quickly and easily switch the bait 4 when desired while the system 2, during use, prevents unwanted removal of the bait 4 by joining it to the bait keeper 20 and securing it with a fishhook 50. The bait keeper 20 in one embodiment also enables the fishhook pointed distal end 58 to become imbedded in the bait 4 and protects the fishhook pointed distal end 58 from underwater obstructions.

In one embodiment, the system 2 also includes a skirt 80. The skirt 80, extending from the neck distal end 36 and partially covering the fishhook extension section 54, is comprised of flexible strands 82 which are secured to the system 2 by a skirt retainer 84 and the annular collar 32 on the neck 30. The flexible strands 82 of the skirt 80, in one embodiment, provide flexibility to the skirt 80 while maintaining a realistic appearance in the water. In addition, although the skirt retainer is depicted as a filament such as a thread or wire it could include other fastening mechanisms including flexible tubing. The skirt 80 is capable of being secured to the neck 30 in the various embodiments illustrated in the following figures and is depicted in outline shape to allow for better visibility of the unique features shown in the illustrated embodiments.

FIG. 1A shows one embodiment where the neck extends out of the body 10 and the fishhook 50 extends out of the neck distal end 36. In FIG. 1A the line connector 70 can also be seen outwardly extending from the exterior surface 12 of the body 10. The line connector 70 is located towards the top 14 of the system 2 allowing the system to be properly oriented while connected on a fishing line 74.

As seen in FIG. 1A the bait keeper 20 is connected to the exterior surface 12 of the body 10 above the neck 30 and generally behind the line connector 70. In addition, the annular collar 32 can be seen positioned between the neck proximate end 34 and the neck distal end 36. In the illustrated embodiment, the fishhook extension section 54 is received by the neck 30 extending from the neck distal end 36. However the system 2 is not limited to such configurations and may in fact alternate the locations of the bait keeper 20, the neck 30 and the fishhook 50 depending on the anticipated fishing conditions and the desired features to address those conditions.

Figure 2:
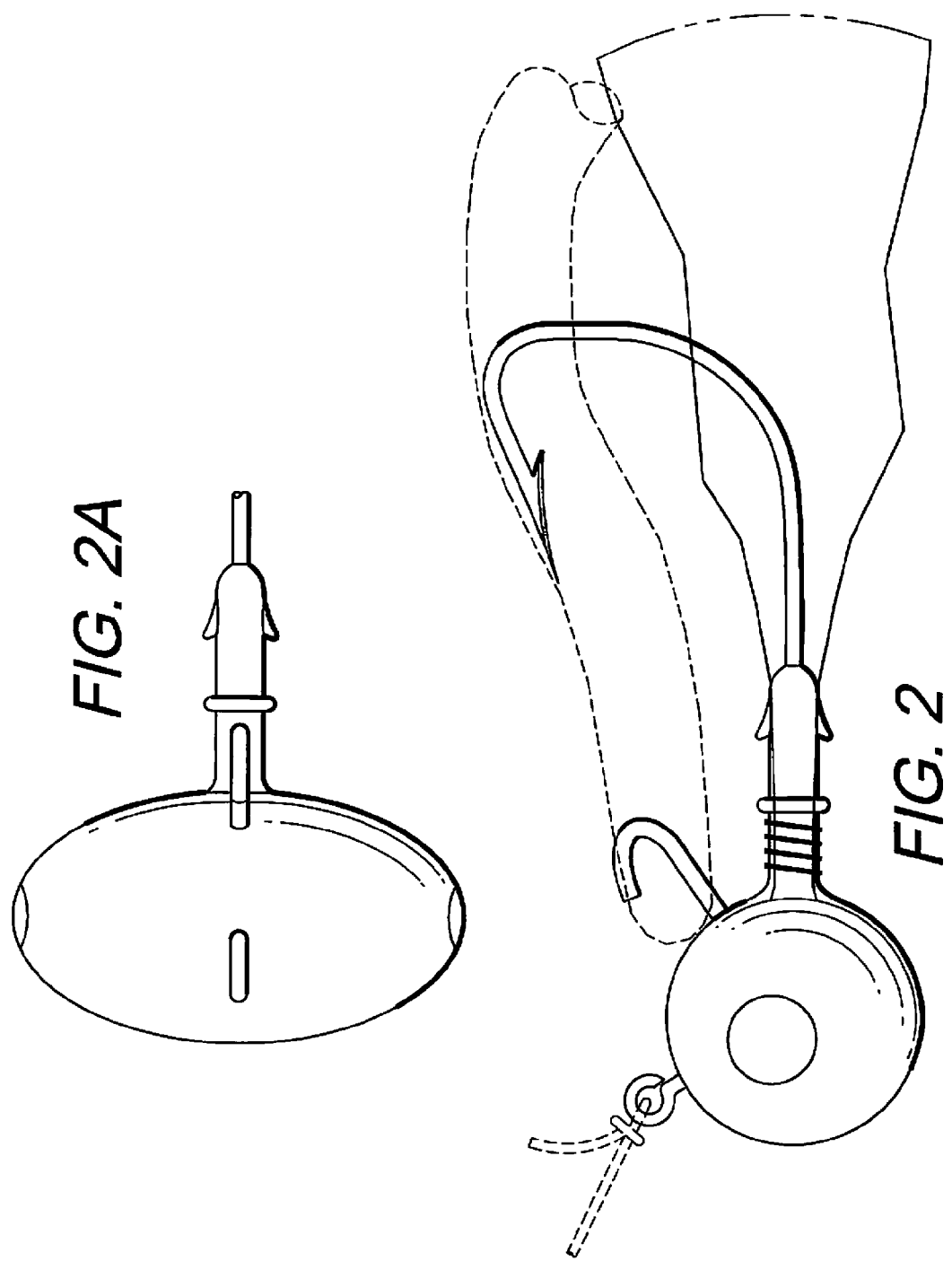
FIG. 2 shows a side elevation of an alternative elliptical body embodiment of the jig and bait system.

FIG. 2 illustrates an alternative embodiment in which the body 110 is elliptically shaped. FIG. 2 also illustrates an alternative embodiment of the neck 130 in which the neck distal end is flared outward enabling the neck to support and secure bait 104. The remaining aspects of the system are similar to FIG. 1 including the skirt 180 outlined in FIG. 2 for clarity purposes. FIG. 2A depicts the system without the annular skirt retainer 184 or skirt 180 even though the system is adapted for encircling the skirt by the annular skirt retainer 184 where the annular skirt retainer 184 is secured on the neck 130 by the annular collar 132.

Figure 3:
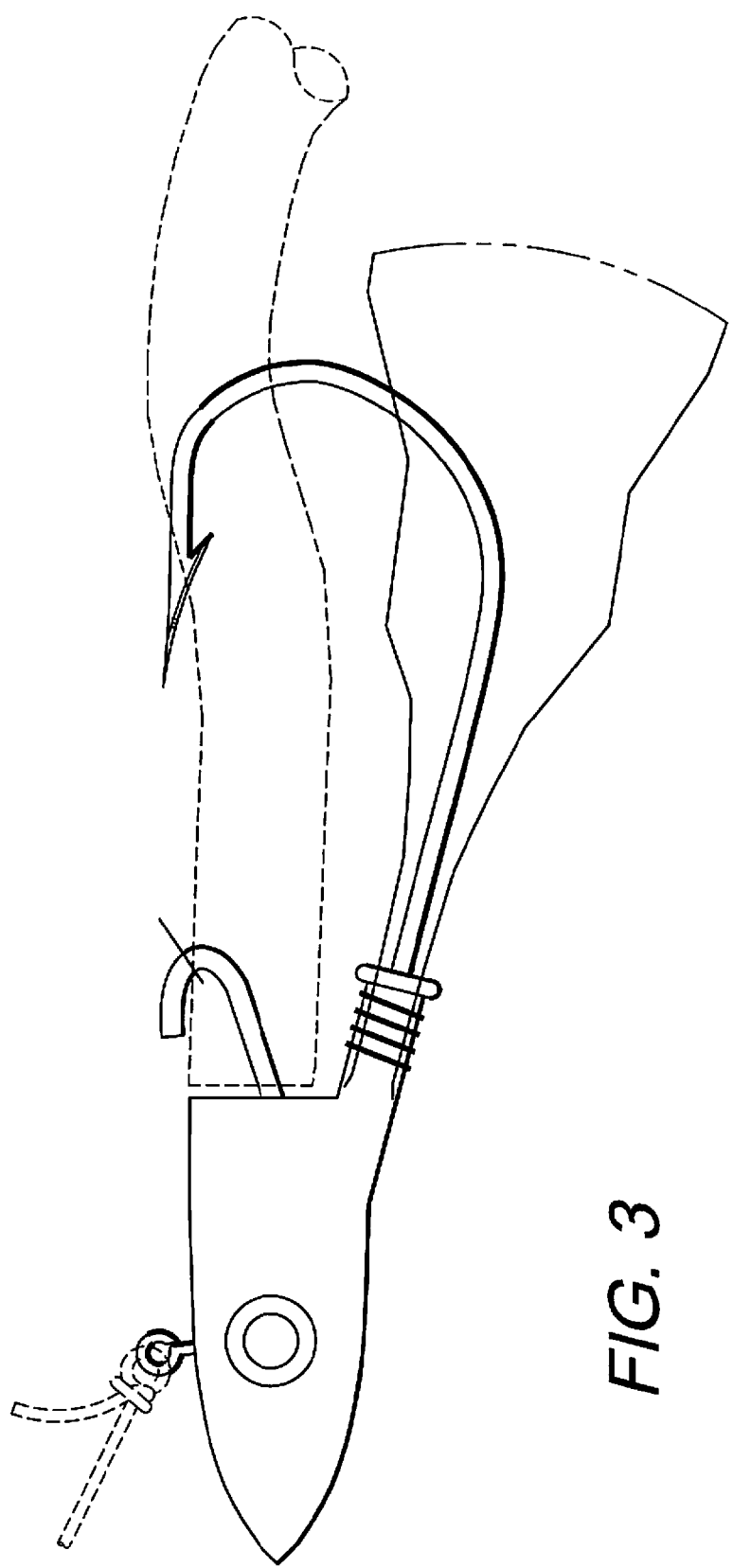
FIG. 3 shows a side elevation of an alternative elongated body embodiment of the jig and bait system.

FIGS. 3 through 7 illustrate the adaptability of the body which is utilized in the current system. The body 210, 310, 410, 510, 610 and 710 (FIGS. 3-7 respectively) can be formed in a variety of fish attracting shapes, including but not limited to fish, insects, jigheads, buzzbaits, spinnerbaits, inline spinners, swimbait heads, crankbait heads, horsehead jigs or other fanciful shapes. In FIG. 3 the fishhook 250 is shown using an alternative shape, illustrating the diversity of fishhook shapes that can be utilized in the present invention.

Figure 4:
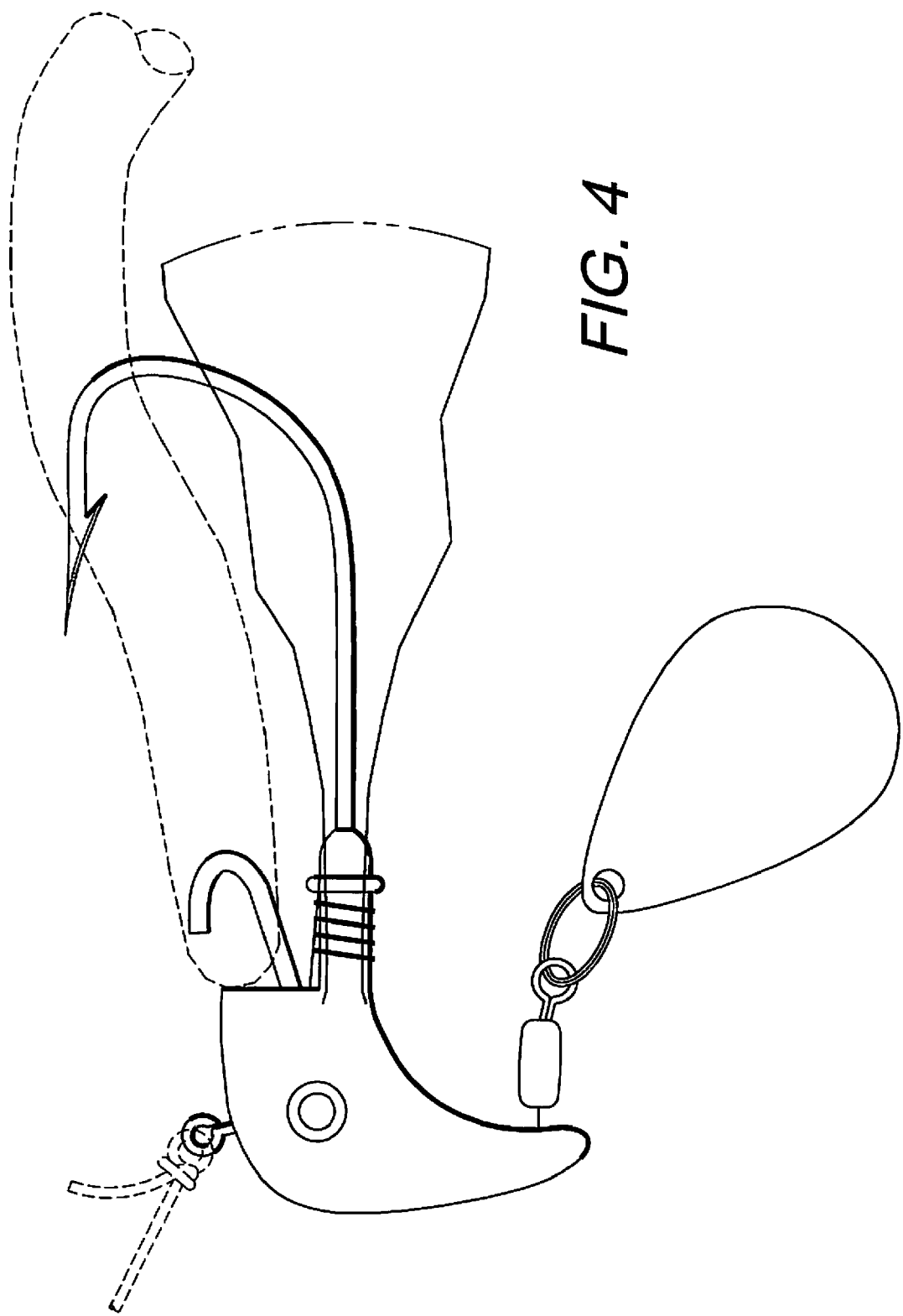
FIG. 4 shows a side elevation of an alternative spinner blade embodiment of the jig and bait system.

FIG. 4 illustrates the jig and bait system 302 optionally utilizing a spinner blade 390 attached to a horsehead jig body 310 to assist in attracting fish. As the system 302 moves in the water, the spinner blade 390 rotates a reflective surface 392 for attracting fish.

Figure 5:
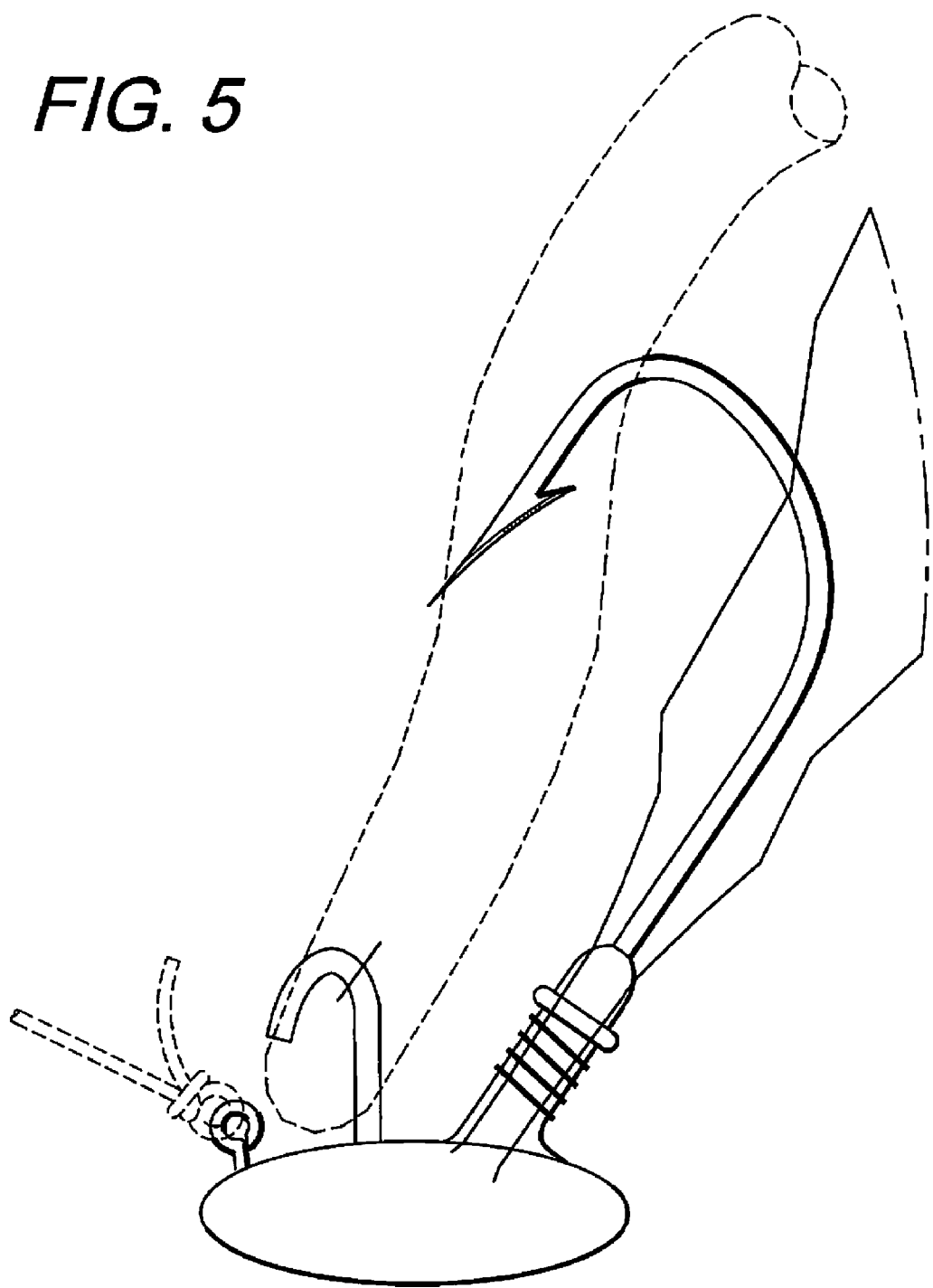
FIG. 5 shows a side elevation of an alternative elongated body embodiment of the jig and bait system.
Figure 6:
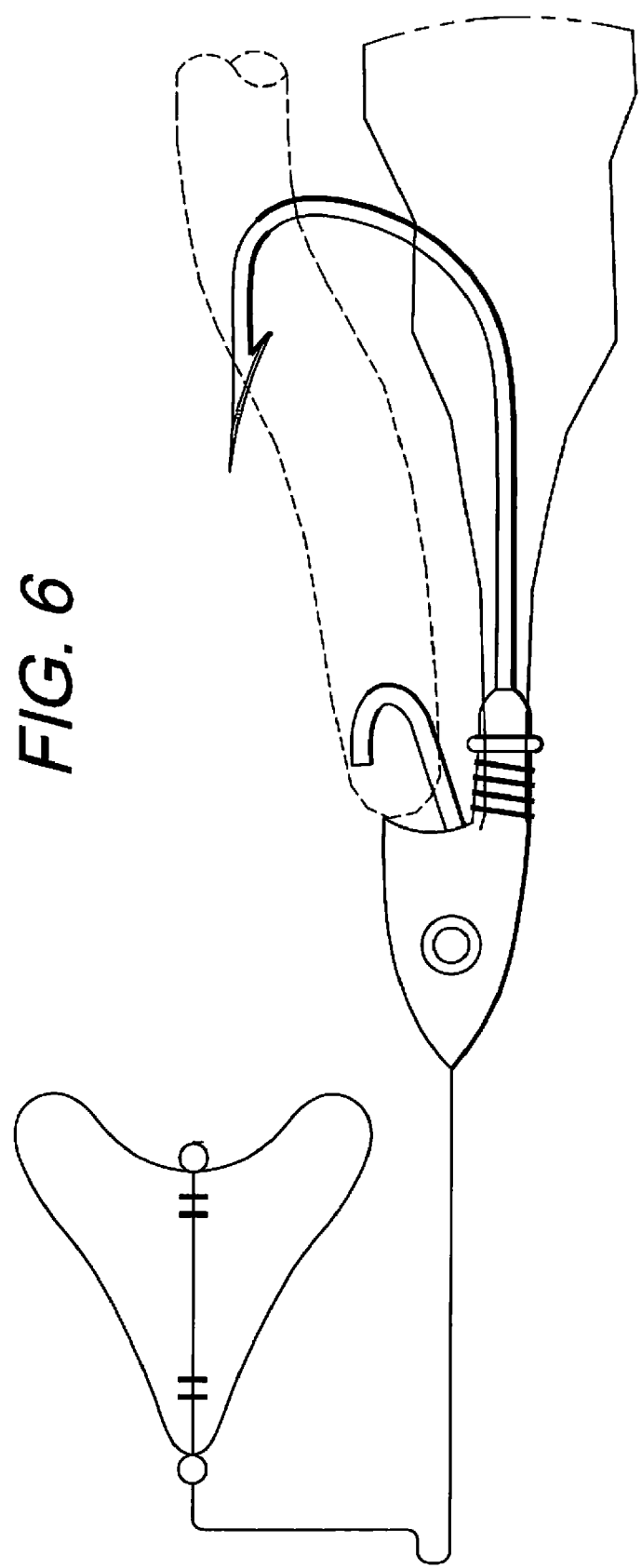
FIG. 6 shows a side elevation of an alternative offset spinner blade embodiment of the jig and bait system.

FIG. 5 illustrates an alternative embodiment of the jig and bait system 502 with an stand-up head body 510, a line connector 570, a bait keeper 520 and a neck 530. FIG. 6 illustrates an alternative wire-frame buzzbait/spinner bait embodiment jig and bait system 602 with a jig 610 and a line connector 670 rotatably mounting a spinner blade 690.

Figure 7:
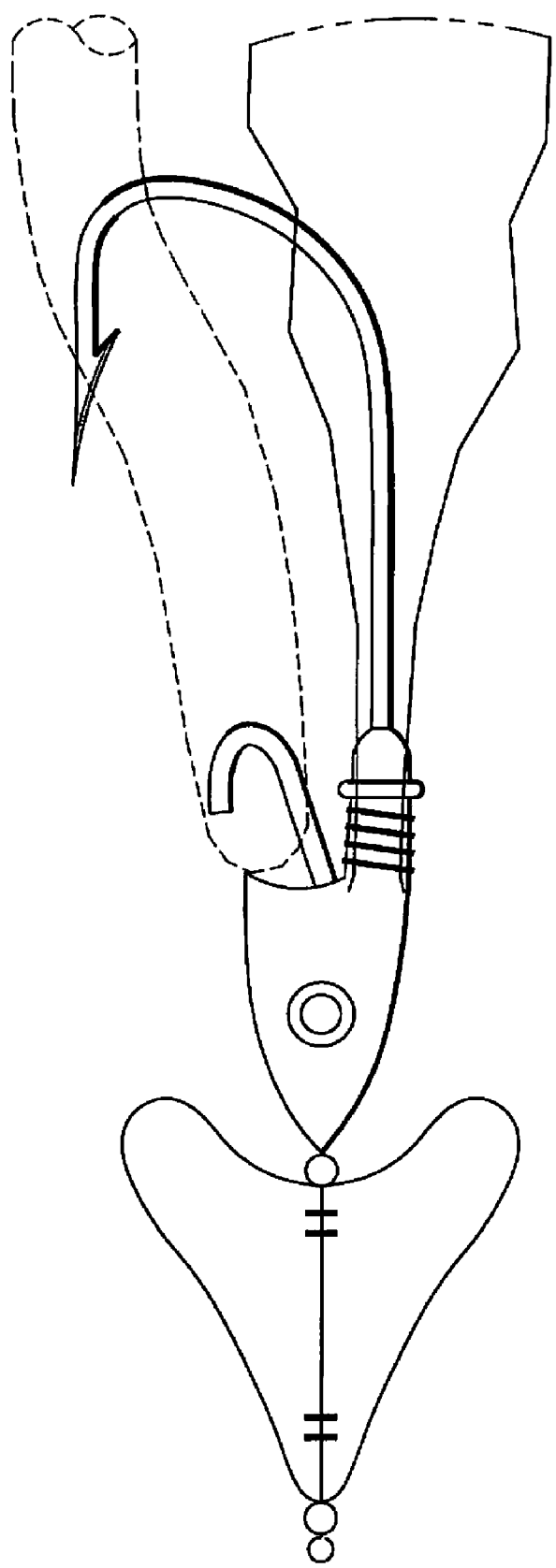
FIG. 7 shows a side elevation of an alternative inline spinner blade embodiment of the jig and bait system.

FIG. 7 illustrates an alternative inline spinner/buzzer configuration 702 in which a spinner blade 790 is attached to a line connector 770, which is also attached to the body 710. In this alternative embodiment, as the system 702 moves in the water the spinner 790 rotates the reflective surface 792 to assist in attracting fish.

Figure 8:
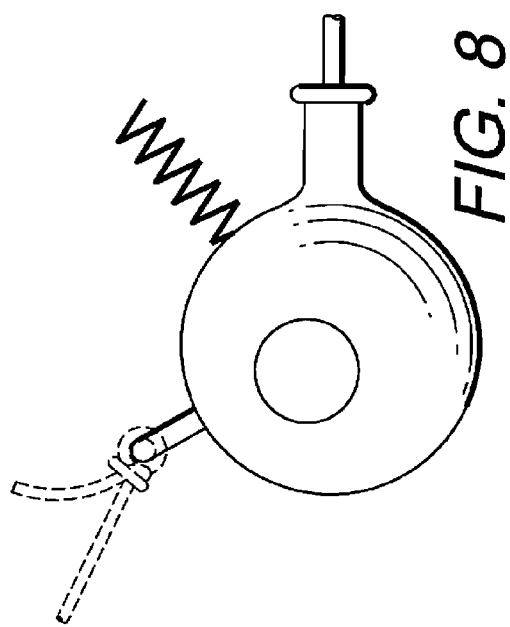
FIG. 8 shows a side elevation of an alternative spiral bait keeper embodiment of the jig and bait system.

FIG. 8 illustrates an alternative spiral-shape screw bait embodiment system 802 in which a bait keeper 820 has different characteristics for use with different types of bait. The bait keeper 820 extends outwardly from a body 810 to secure the bait. The keeper 820 has a spiral shape to provide different mounting characteristics to secure bait thereon.

Figure 9:
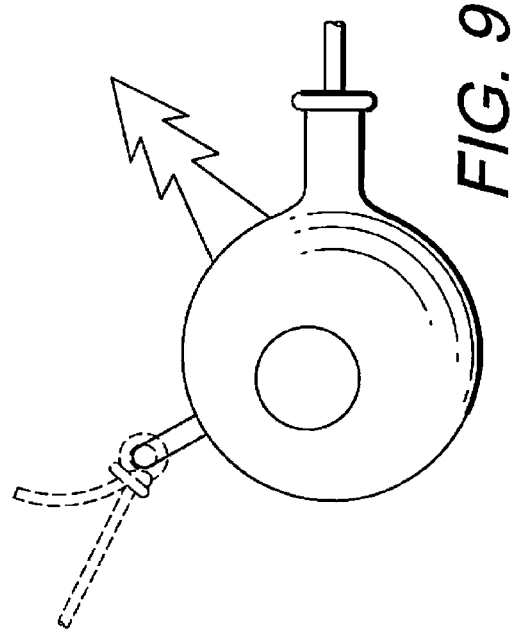
FIG. 9 shows a side elevation of an alternative spear-barbed bait keeper embodiment of the jig and bait system.

FIG. 9 illustrates another alternative bait keeper 920 configuration in which the keeper 920 is configured in a lance shape to provide different mounting characteristics to secure the bait on the bait keeper 920 and to assist in penetrating the bait.

Figure 11:
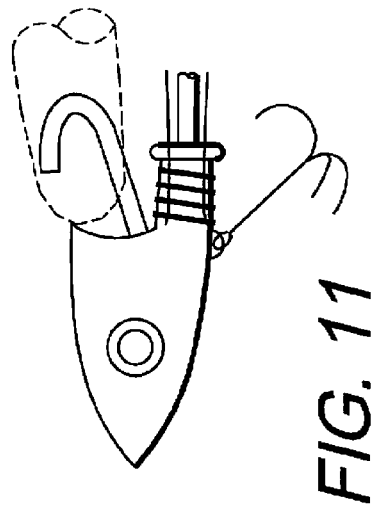
FIG. 11 shows a side elevation of an alternative hook embodiment of the jig and bait system.
Figure 10:
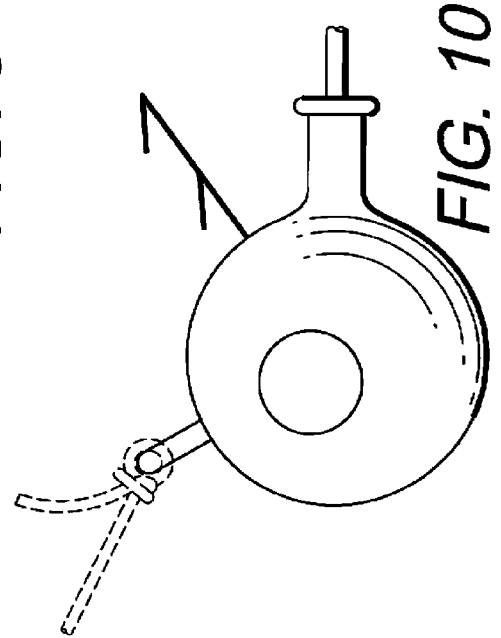
FIG. 10 shows a side elevation of an alternative double-hanger bait keeper embodiment of the jig and bait system.

FIG. 10 illustrates another embodiment in which a bait keeper 1020 utilizes a double-hanger configuration to secure the bait. FIG. 11 illustrates an alternative embodiment with a secondary fishhook 1160 secured to a body 1110 using a fishhook connector 1162. Although the fishhook connection 1162 is depicted on the bottom 1116 of the body 1110, the fishhook connection 1162 is not limited to a bottom orientation.

Figure 12:
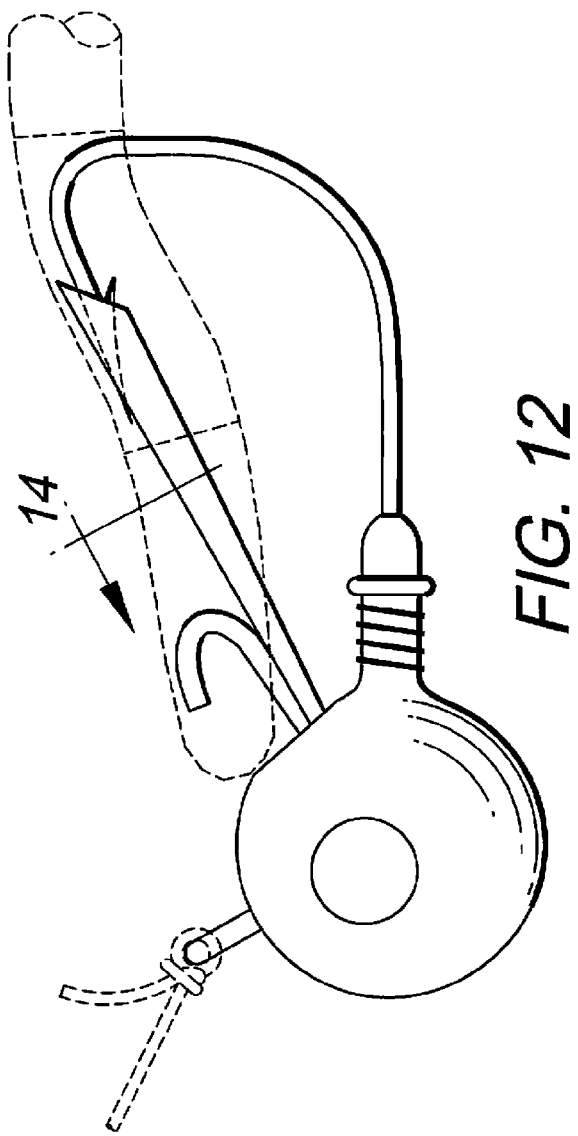
FIG. 12 shows a side elevation of an alternative latch embodiment of the jig and bait system.

FIG. 12 depicts an alternative latching embodiment in which the system 1202 provides a latch 1272 with a latch extension section 1278 extending from a latch proximate end 1274 and terminating at a latch distal end 1276 to capture a fish on the fishhook 1250. The latch can be used in conjunction with a bait keeper or as a substitute for a bait keeper. In addition, the latch 1272 can serve as a weedguard, protecting the fishhook 1250 from underwater obstacles. In one embodiment, the bait 1204 can be threaded onto the latch 1272 with the bait 1204 at least partially covering the latch 1272. Alternatively, the bait be configured with a slot in which the latch 1272 is inserted with the fishhook pointed distal end 1258 received by the latch proximate end 1274 while both are received inside a slotted portion 1206 of the bait 1204. As contact is initiated by a fish when the fish exerts sufficient pressure, such as upon hookset, the latch mechanism exposes the fishhook pointed distal end 1258 to allow capture of the fish. The alternative bait configuration is also adapted to receive the bait keeper 1220 in a solid section 1208 of the bait which is arranged adjacent to the slotted section 1206 of the bait 1204.

In addition, the latch 1272 can protect the fishhook from underwater obstacles and the latch 1272 provides tension on the bait 1204 preventing false or early removal of the bait 1204 and creating a barrier to prevent captured fish from spitting out the fishhook 1250 or allowing the fish to throw the fishhook 1250. The tension is created by using a latch 1272 comprised of a high-strength, high-memory characteristic material. The high-strength characteristic prevents the fish from getting free and the high-memory characteristic creates a closing bias in the latch 1272. The latch 1272 swings from a closed position to an open position upon contact with the fish and returns towards its closed position after the fishhook captures the fish, such as when the fishhook pointed distal end 1258 pierces the mouth of the fish. The fish is prevented from moving off the fishhook pointed distal end 1258 even when the fishhook pointed distal end 1258 does not pierce the mouth of the fish by causing pressure against the fish, preventing the fish from removing the fishhook pointed distal end 1258. To prevent a false opening of the latch mechanism 1272, such as when the fishhook 1250 comes into contact with tree branches or rocks, and to provide sufficient strength to securing the fish, the latch is constructed of a high strength material. The latch 1272 can be comprised of a metallic, semi-metallic or non-metallic material. Preferably, the latch 1272 is comprised of a non-oxidizing metallic material such as titanium or stainless-steel.

FIG. 12 illustrates the closed position of the latch 1272. In the closed position, the fishhook distal end 1258 will be received by the latch distal end 1276. When contact with a fish occurs, the latch extension section 1278 pivots in a clock-wise motion allowing the fishhook pointed distal end 1258 to capture the fish. After capture of the fish, the latch extension section 1278 is urged back towards the closed position.

Figure 14:
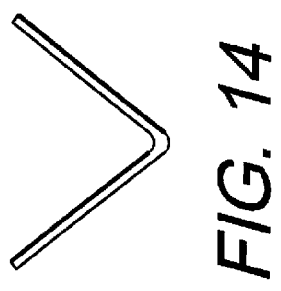
FIG. 14 shows a section of the alternative latch embodiment of the jig and bait system taken generally along line 14 in FIG. 12.
Figure 13:
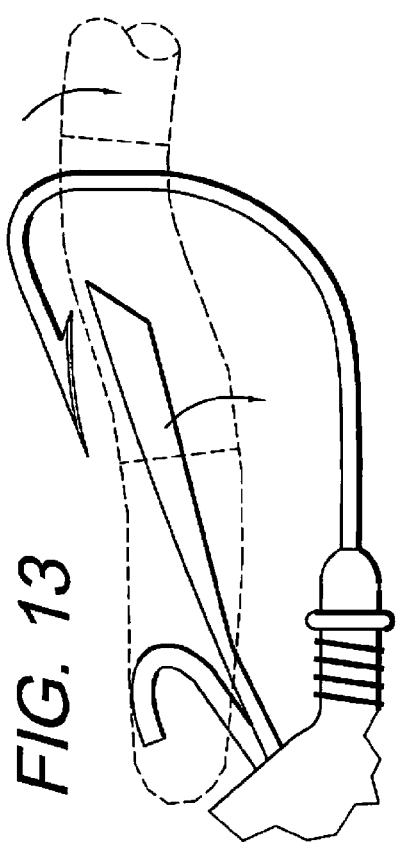
FIG. 13 shows a side elevation of the alternative latch embodiment in the open position of the jig and bait system.

FIG. 13 illustrates the latch 1272 in an open position with the extension section 1278 be deformed downward with the latch distal end 1276 being separated from the fishhook pointed distal end 1258. In one embodiment the latch 1272 is received by a slotted section 1206 which is adjacent to a solid section 1208 of the bait 1204. FIG. 14 illustrates a cross-section of the latch distal end 1276 taken along line 14 in FIG. 12. The V-shape of the latch distal end 1276 is adapted to receive the fishhook pointed distal end 1258 by the latch distal end 1276. As shown in FIG. 12, the latch 1272 tends to retain the bait 1204 in place on the hook 1250.

Figure 15:
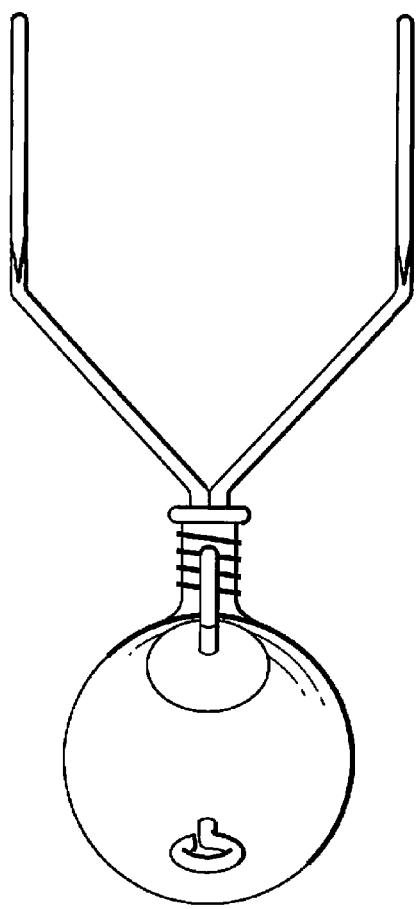
FIG. 15 shows a top plan of an alternative multiple-hook embodiment of the jig and bait system.
Figure 16:
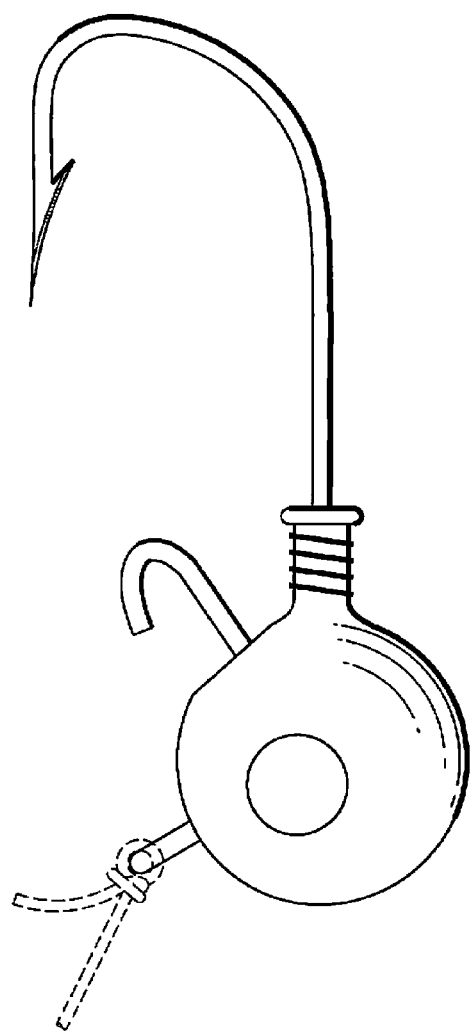
FIG. 16 shows a side elevation of the alternative multiple-hooked embodiment of the jig and bait system.
Figure 17:
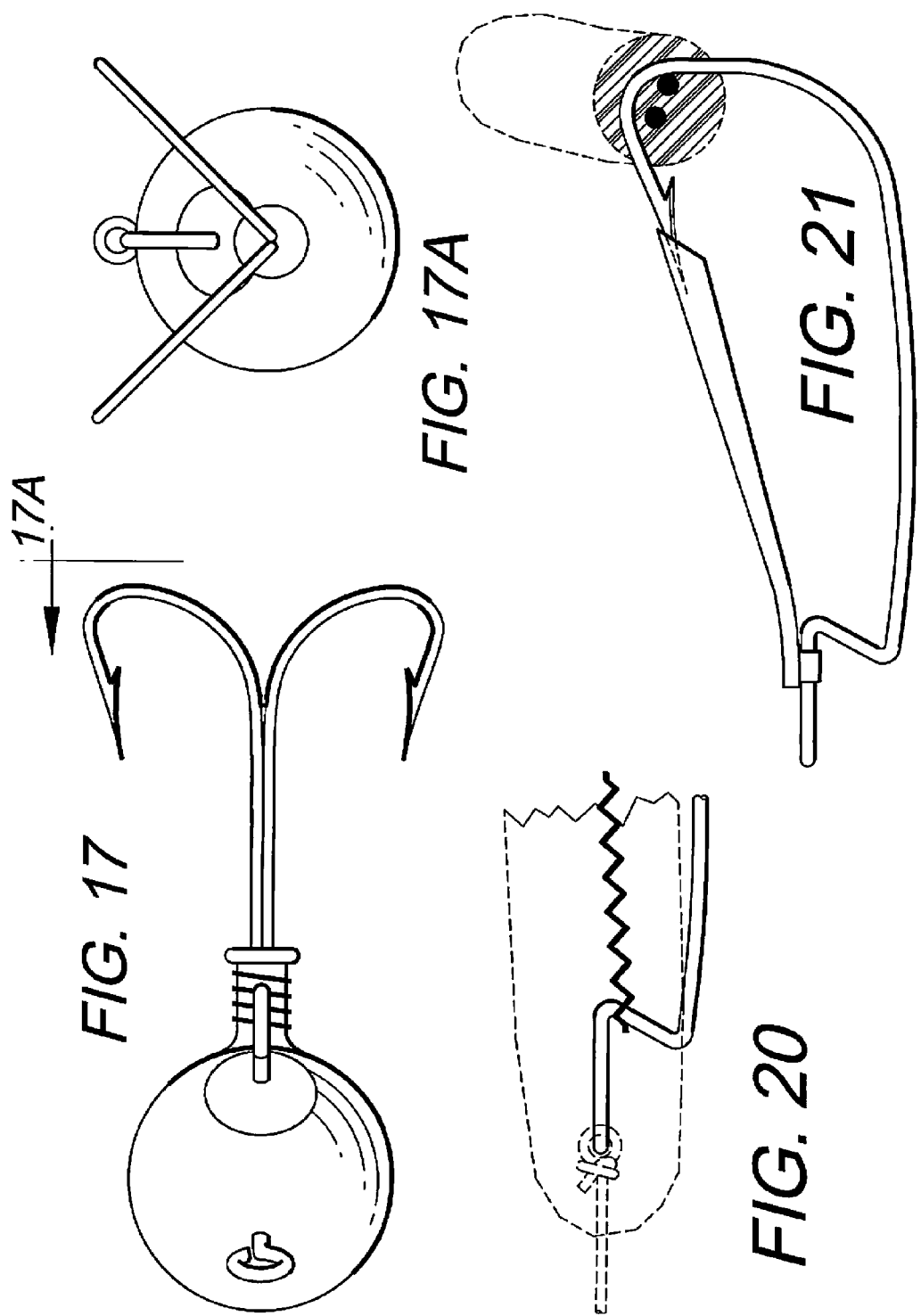
FIG. 17 shows a top plan of an alternative multiple-hooked embodiment of the jig and bait system.

FIGS. 15 and 16 show an alternative embodiment double-hooked fishhook 1350 in which a first angled fishhook extension section 1352 and a complementary secondary angled fishhook extension section 1362 are angled relative to the longitudinal axis of the system. Both the first and second fishhook angled extension sections 1352, 1362 are connected to and extend from the neck distal end 1336 and the secondary fishhook extension section 1364 is connected to the secondary angled fishhook extension 1362 and to the secondary curved return section 1366 which terminates at the secondary fishhook pointed distal end 1368. Although FIG. 16 shows a double-fishhook 1350, there are various alternative configurations including multiple hooks and alternative fishhook alignments. For example, in FIG. 17, fishhooks 1450 with different configurations 1450 are shown without the fishhook angle extension sections. As illustrated in FIG. 17A taken along line 17A in FIG. 17, the fishhooks are rotated relative to one another between 0 and 180 degrees with the bait keeper 1420 oriented towards the top.

Figure 18:
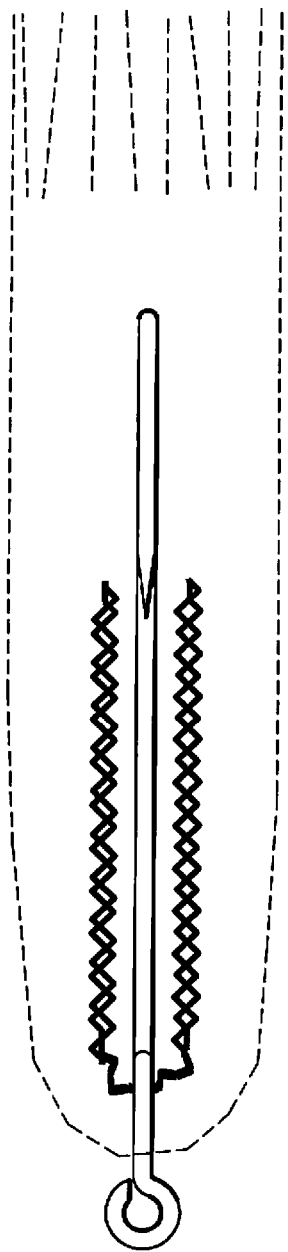
FIG. 18 shows a top plan of a reinforced artificial bait embodiment of the jig and bait system.

FIG. 18 illustrates an embodiment of the bait 1504 which is artificial. Alternatively, the bait could be live. As illustrated, the artificial bait 1504 is internally reinforced with a filament 1596 which is embedded into the flexible bait material 1598. The flexible bait material 1598 could be formed using various material types to provide different fishing characteristics including plastisol. The use of the bait keeper 1520 provides for rapid removal and changing of the bait 1504 while preventing movement of the bait during use.

Figure 19:
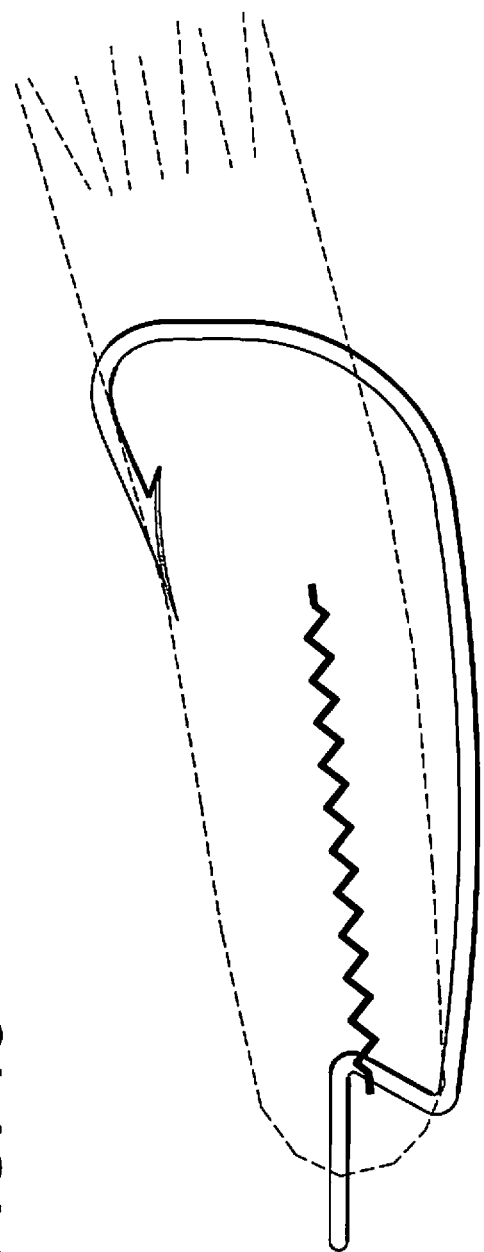
FIG. 19 shows a side elevation of a reinforced artificial bait embodiment of the jig and bait system.

FIG. 18 illustrates the bait keeper 1520 inserted into and securing the bait 1504 by positioning the bait keeper 1520 inside the flexible bait material 1598 such that the filament 1596 enables the bait keeper 1520 to secure the bait 1504. When the system 1502 is in use, the bait 1504 may experience a dragging force from a fish or the water causing the bait to move in direction opposite to the movement of the system 1502. By internally reinforcing the bait 1504 with the filament 1596 and securing the bait with the bait keeper 1520, the filament 1596 and the bait keeper 1520 join to secure the bait. In addition, as illustrated in FIG. 19, the bait 1504 is secured using the fishhook 1550. Although the reinforcing filament 1596 can include a number of different fibers and materials, preferably the filament 1596 is a braided acrylic yarn which is frictionally secured by the flexible bait material 1598. In FIGS. 18 and 19 the line connector 1570 is external to the bait. Alternatively, FIG. 20 illustrates the line connector 1670 being positioned internally with respect to the bait 1604 which has an internal filament 1696.

FIG. 21 shows another alternative embodiment in which the internally reinforcing filament 1796 threaded bait 1704 is baited onto a fishhook 1750 with a latch mechanism 1772 attached to the keeper 1720, the keeper 1720 connecting the fishhook 1750 to the line connector 1770.

Figure 22:
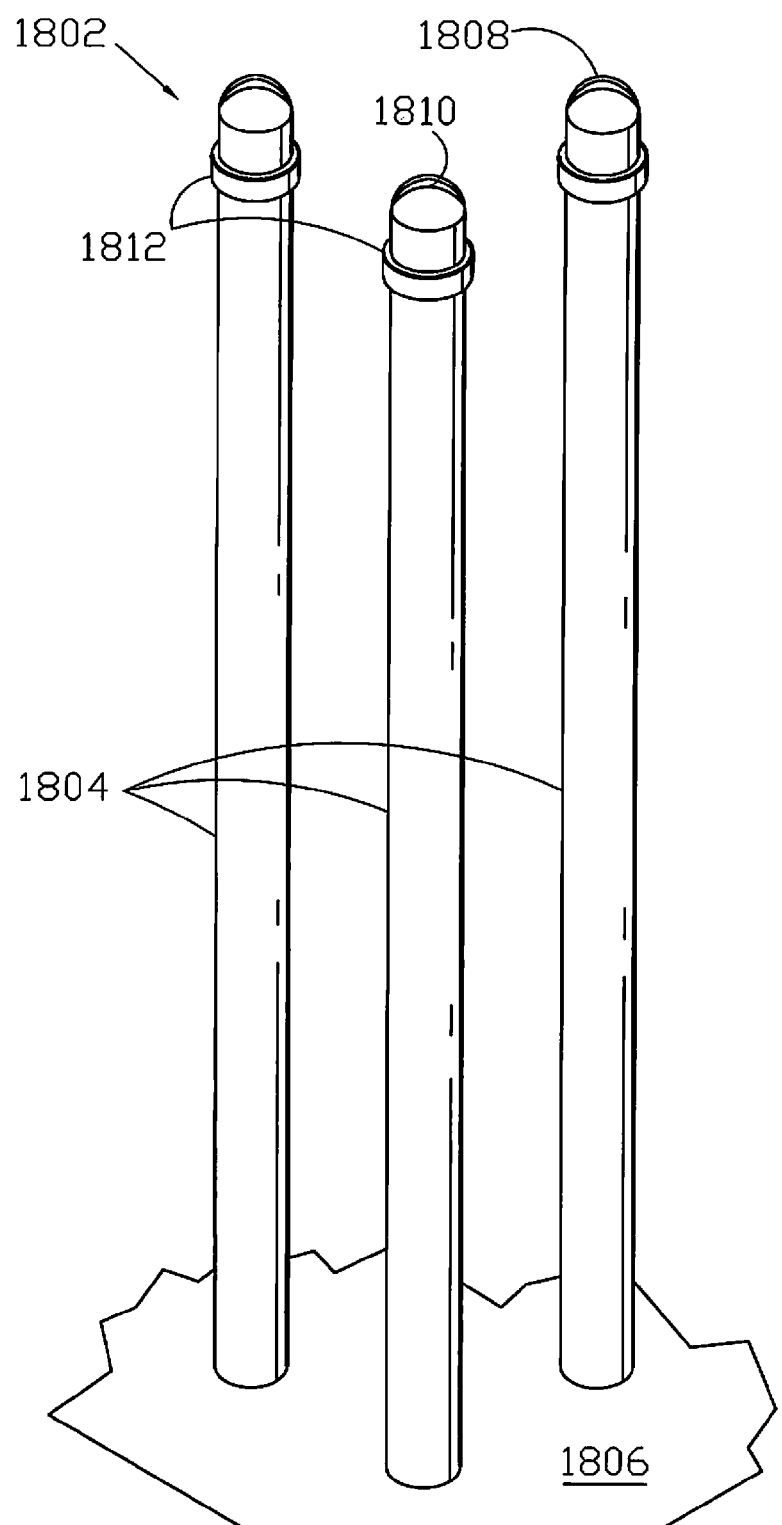
FIG. 22 shows multiple forms for use in a manufacturing method embodying an aspect of the present invention.
Figure 23:
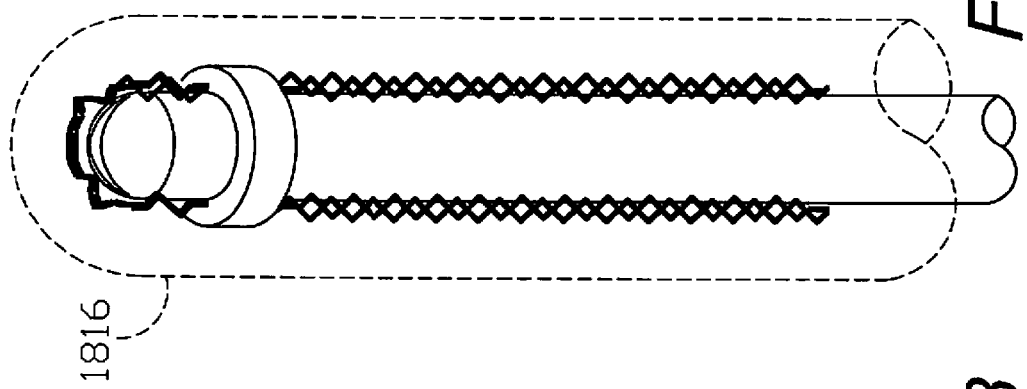
FIG. 23 shows reinforcing yarn placed on one of the forms.
Figure 24:
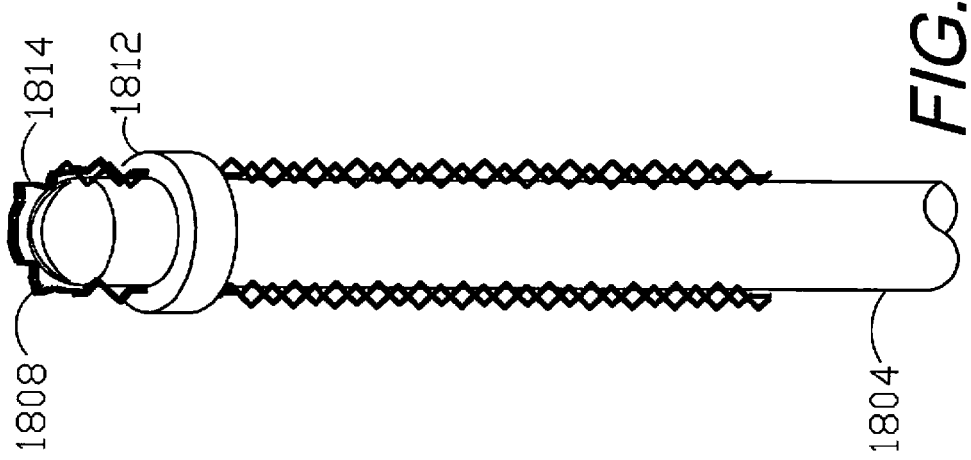
FIG. 24 shows a plastic body formed over the reinforcing yarn.
Figure 23A:
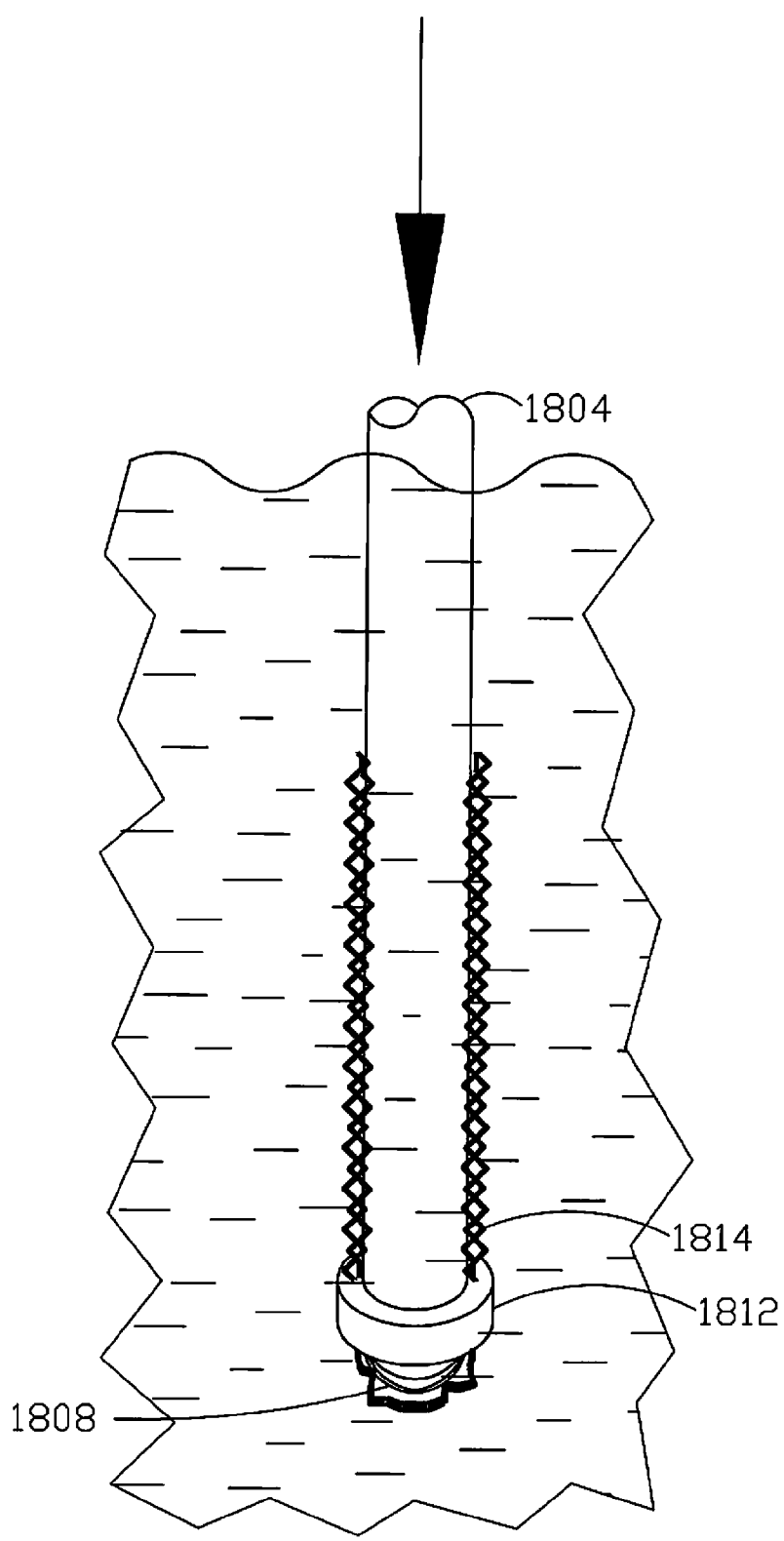
FIG. 23A shows one of the forms being dipped into liquid plastic material.
Figure 24A:
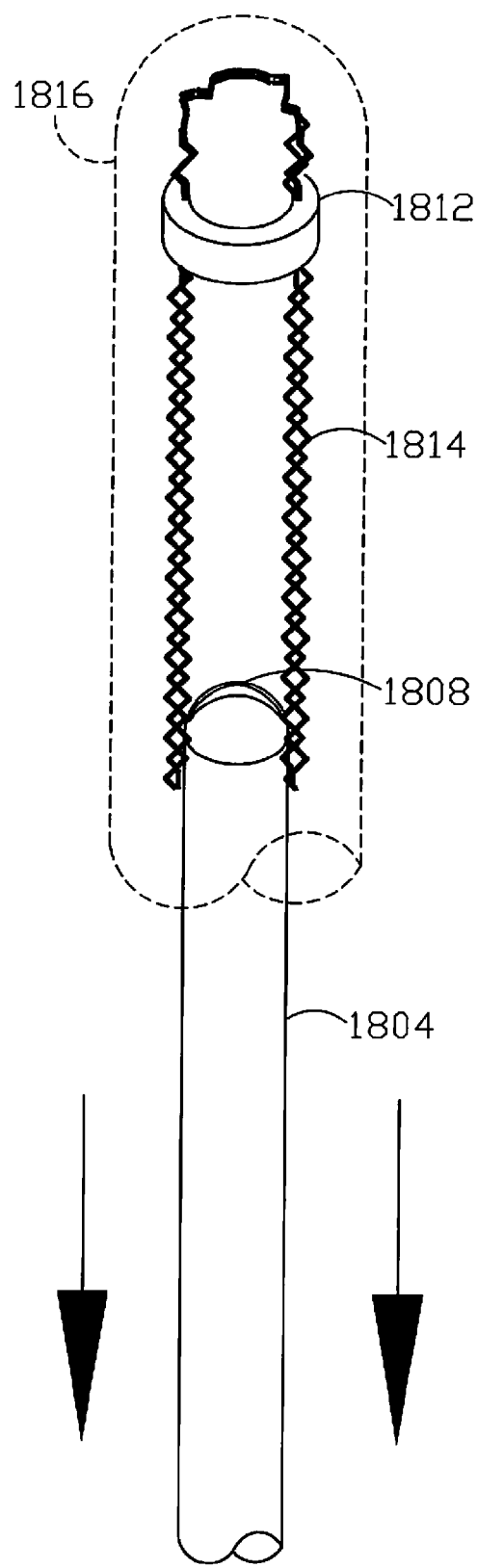
FIG. 24A shows one of the forms being extracted from a plastic body.

FIG. 22 shows a tool 1802 with multiple forming rods 1804 for forming bait according to a manufacturing method embodying an aspect of the invention. A base 1806 mounts the rods 1804, each of which terminates at a rounded, distal end 1808 with a notch 1810. An annular band 1812 is placed around each rod 1804 slightly below its distal end 1808 and is adapted for retaining a section of reinforcing yarn 1814 (e.g. acrylic or some other suitable material, without limitation) in cooperation with the notch 1810 (FIG. 23). FIG. 23A shows a rod 1804 being dipped into liquid plastic material coating a rod 1804, band 1812, and reinforcing yarn section 1814. FIG. 24 shows a bait body 1816 formed over a rod 1804 and curing whereby the section of reinforcing yarn 1814 is embedded within the bait body 1816. Preferably the band 1812 comprises the same or a similar material to the bait body 1816 (e.g., without limitation, Plastisol material). FIG. 24A shows the forming rod 1804 being extracted from the bait body 1816. It will be appreciated that the tool 1802 facilitates producing multiple reinforced bait bodies 1816 simultaneously. For example, with the band's 1812 and the reinforcing yarn sections 1814 in place, the rods 1804 can be dipped into liquid material for coating the rods 1804, the bands 1812 and the reinforcing yarn sections 1814. Multiple, successive dipping operations can be utilized for "building up" the bait body 1816. By heating the material, the band 1812 can effectively be melted into the bait body 1816.

Figure 25:
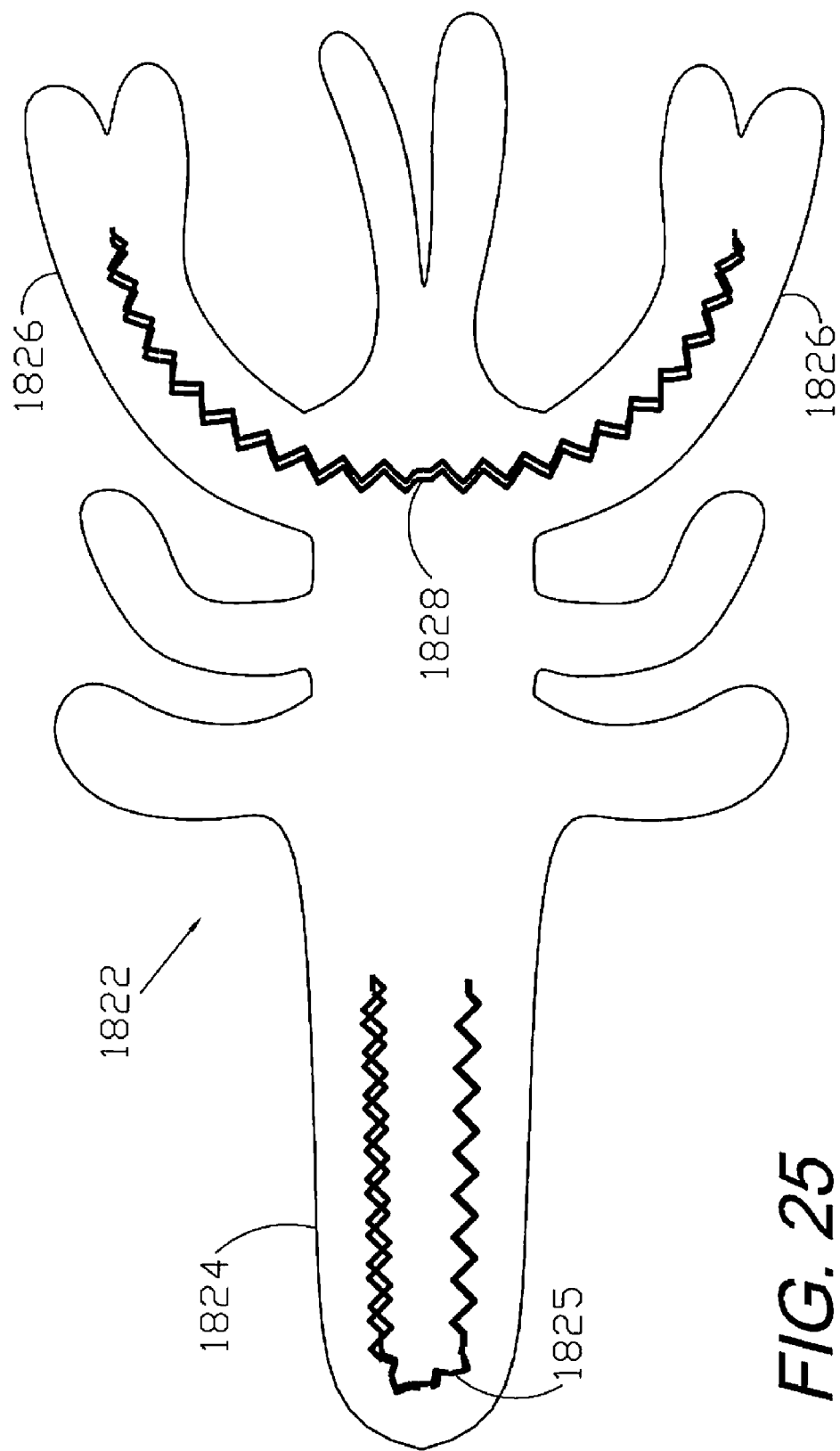
FIG. 25 shows a lure with appendages and receiving reinforcing yarn.

FIG. 25 shows a bait 1822 comprising another aspect of the present invention. The bait 1822 includes a main body 1824, in which a section of reinforcing yarn 1825 with a U-shaped configuration is embedded. The bait 1822 also includes appendages 1826, in which an arcuate-shaped section of reinforcing yarn 1828 is provided. The bait 1822 can be formed with a suitable mold, in which the reinforcing yarn sections 1825 and 1828 can be placed prior to pouring the body material. The appendage reinforcing yarn section 1828 is effective for preventing fish from biting off the appendages.

Figure 26:
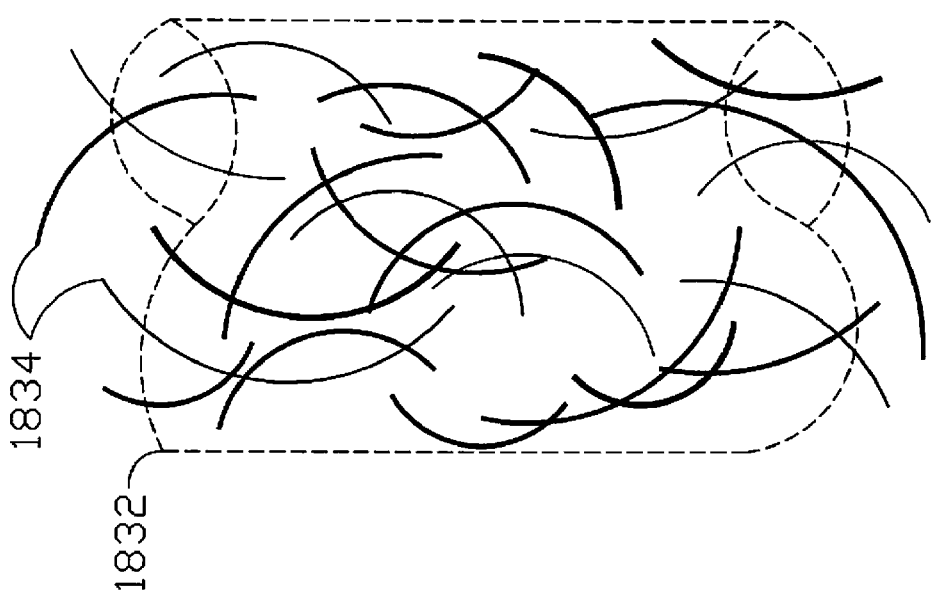
FIG. 26 shows a lure body with reinforcing strands embodying another aspect of the present invention.

FIG. 26 shows a section of a bait body 1832 with multiple, individual strands 1834 of a suitable reinforcing material, such as polyester, which can be mixed with a suitable plastic prior to injecting or pouring the body material.

Figure 27:
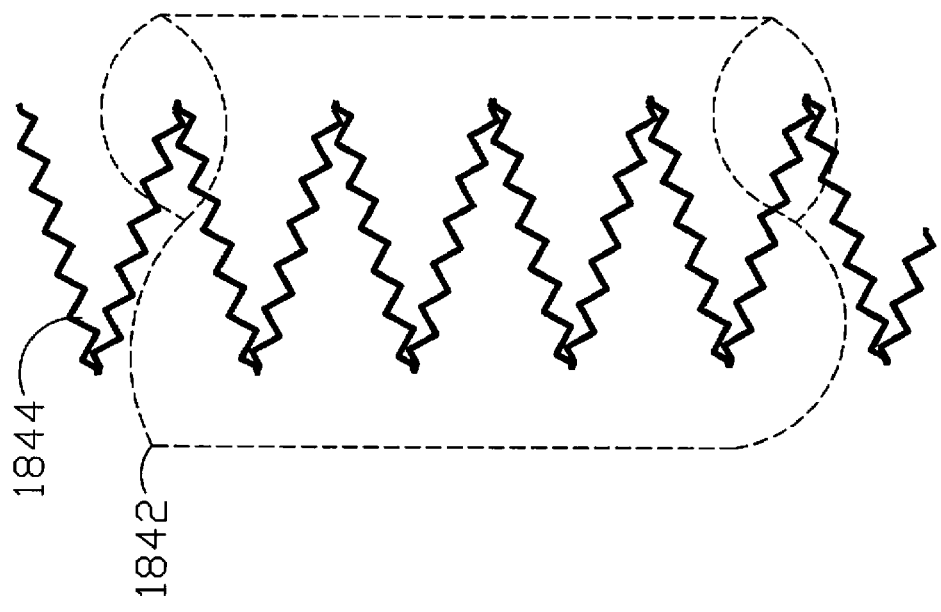
FIG. 27 shows a lure body with a length of reinforcing yarn in a helical configuration embodying another aspect of the present invention.

FIG. 27 shows a section of a bait body 1842 with a section of reinforcing yarn 1844, which can be formed in a helical pattern. With such a helical pattern as shown, the bait body 1842 is adapted for stretching (depending upon the elasticity of the material) and retracting back to its original configuration. In this way a fish biting the bait body 1842 will typically stretch it a certain amount, whereafter the bait body 1842 can snap back or retract to a retracted position further up on the hook out of the way of the hook end. Otherwise, without the cooperation of such a bait body and reinforcing yarn, the bait body could become bunched up around the hook end and potentially interfere with hooking fish on same. In addition to the helical yarn configuration shown, the yarn can have various configurations, which can accommodate various amounts of stretching and retraction.

III. Alternative Aspect Lure Manufacturing Process

FIGS. 28A-39 show a process of making a fishing lure or bait 1921 having internal reinforcement 1914 by either injection molding bait material, or by hand pouring bait material according to a manufacturing method embodying an alternative aspect of the invention. Referring to FIGS. 28A-33, first and second mold plates 1902, 1904 manufactured from a rigid material including, but not limited to, metal, steel, and aluminum are provided for injection molding of bait 1921. The first mold 1902 contains a plurality of adjacent first bait reliefs 1906 each corresponding to one-half of a bait 1921 to be molded. While an elongated worm-like bait 1921 is shown and described, the bait 1921 is not to be construed as limiting, only as an example of a type of bait that may be manufactured using the method embodying aspects of the present invention. Any shaped lure may be adapted to the present manufacturing method.

A rigid head pin 1910 and two rigid tail pins 1912 orientated perpendicular to the bottom of the first bait relief 1906, are located at one end of each first bait relief 1906, where the head pin 1910 is opposite the tail pins 1912 and nearest the end of the bait relief 1906. The pins 1910, 1912 are manufactured from a rigid material including, but not limited to metal, steel, and copper. The head pin 1910 is centrally located within an end of the first bait relief 1906 and extends above the face 1903 of the mold plates 1902. A concave notch 1911 facing the top of the first base relief 1906 is located at the distal end 1925 of the head pin 1910. Two adjacent tail pins 1912 are located opposite the head pin 1910 and toward the other end of the first bait relief 1906. The tail pins 1912 extend above the face 1903 of the mold plates 1902 and have concave notches 1913 facing towards the center of the first bait relief 1906 located at the distal end 1927 of the tail pins 1912. The pins 1910, 1912 function to hold the reinforcement 1914 while liquid bait 1921 material cures, and to create cavities 1922, 1923 in the bait 1921. Although pins with notches have been shown and described, wire pins with bends having the same orientations as the notches 1911, 1913 may be used. The reinforcement 1914 may comprise any elongated fibrous material including, but not limited to acrylic yarn, cotton thread, and spun yarn.

A second mold plate 1904 contains a plurality of adjacent second bait reliefs 1908 corresponding to the remaining half of the bait 1921 not provided by the first bait relief 1906. Injection ports 1918 permit introduction of liquid bait 1921 material into the first and second bait reliefs 1906, 1908. The bait 1921 could be formed using various types of materials, including, but not limited to liquid plastic, plastisol, polyester, and flexible thermoplastic, preferably plastisol. A plurality of cutting edges 1916, such as metal blades, project from the surface 1905 for cutting the reinforcement 1914 extending between the first bait reliefs 1906.

Figure 28A:
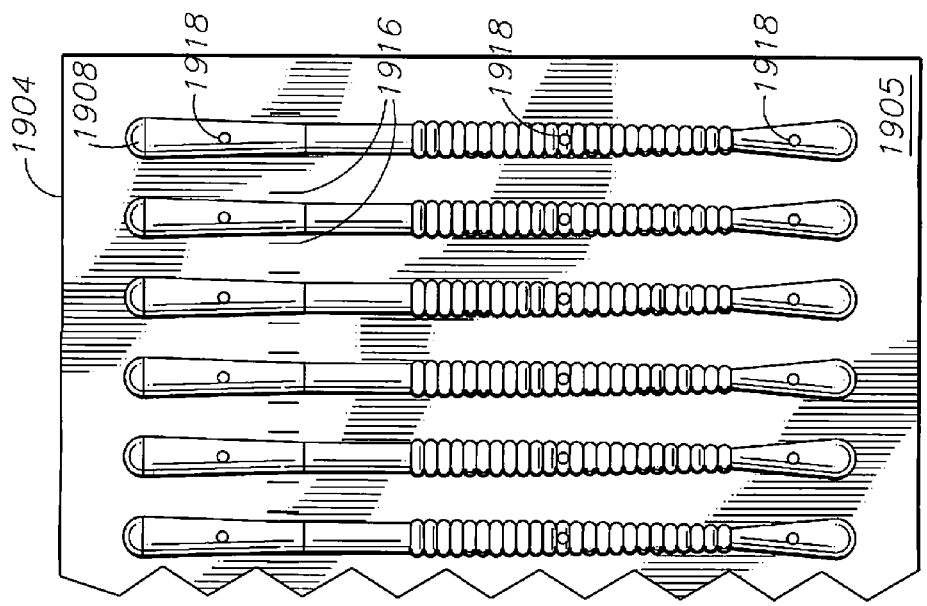
FIG. 28A shows a first half of an injection mold embodying an aspect of the current invention.
Figure 28B:
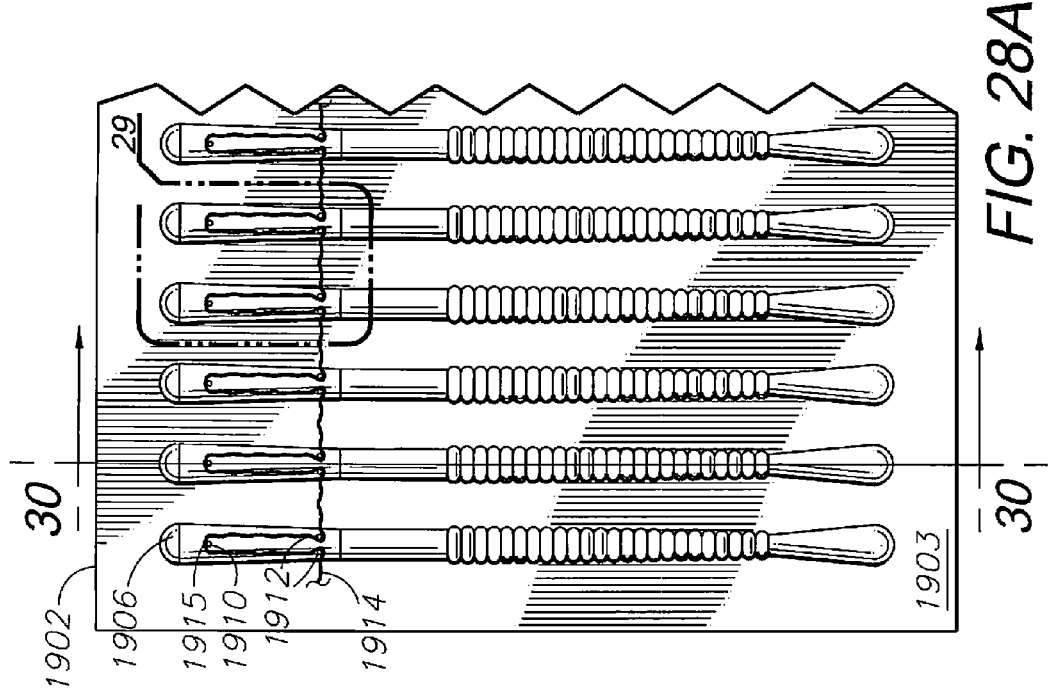
FIG. 28B shows a second half of an injection mold embodying an aspect of the current invention.
Figure 29:
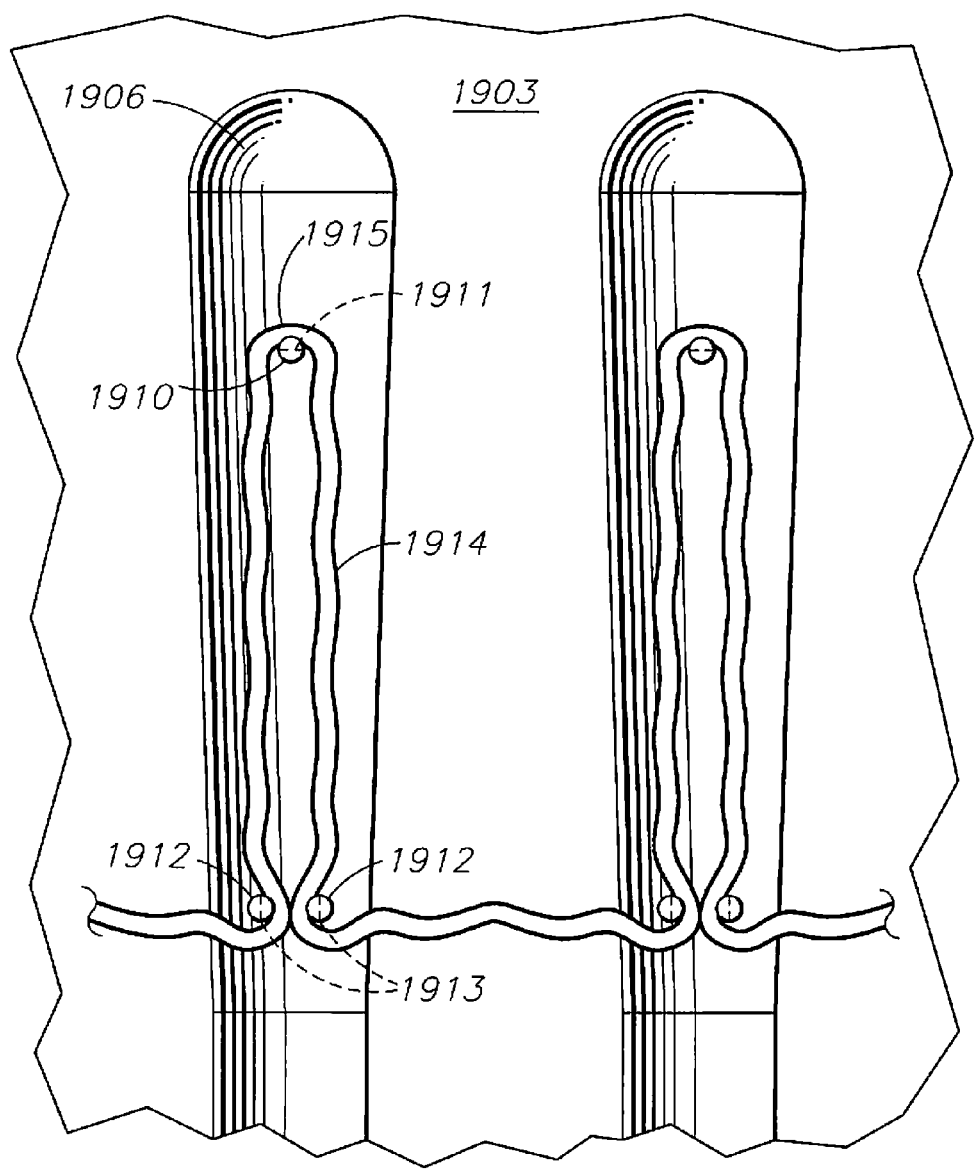
FIG. 29 is an enlarged fragmentary view of the first bait relief taken generally within circle 29 in FIG. 28A.

The bait 1921 may be formed by injection molding utilizing the process illustrated in FIGS. 28A-33. Referring to FIGS. 28A-29, a length of reinforcement 1914 is positioned within the notches 1911, 1913 of pins 1910, 1912 respectively, either by hand or using an automated machine. The reinforcement 1914 extending continuously between each bait relief 1906 forms an elongated V-shape within the bait relief 1906. The reinforcement 1914 forms a head loop 1915 as it wraps around the head pin 1910. The first and second mold plates 1902, 1904 are aligned whereby a first bait relief 1906 is opposite a second bait relief 1908, and the mold plates 1902, 1904 are drawn together by any conventional means whereby the faces 1903, 1905 engage in a sealing relationship (FIGS. 31-32) causing the cutting edges 1916 to cut the reinforcement 1914 spanning between adjacent first bait reliefs 1906, and pressing the reinforcement 1914 between the bait reliefs 1906 between the faces 1903, 1905 keeping the reinforcement 1914 within the bait relief 1906 taught against the pins 1910, 1912. Liquefied bait 1921 material is injected into the cavity created by the first and second reliefs 1906, 1908 through the injection ports 1918 while the molds 1902, 1904 are heated and cooled by conventional means. After the bait 1921 material has cured, the molds 1902, 1904 are separated and the bait 1921 is ejected (FIG. 33) leaving the V-shaped reinforcement 1914 within the bait 1921. Referring to FIGS. 34-35, the molded bait 1921 is shown with the reinforcement 1914 integrally molded and embedded therein. The presence of the pins 1910, 1912 has left head and tail cavities 1922, 1923 respectively in the bait 1921. The head cavity 1922 provides for proper placement of a hook (not shown) into the bait 1921 by identifying the location of the head loop 1915, and by guiding the hook through the head loop 1915 thereby enabling the reinforcement 1914 to engage a hook and inhibit the hook from ripping out of the bait 1921.

IV. Second Alternative Lure Manufacturing Process

Figure 38:
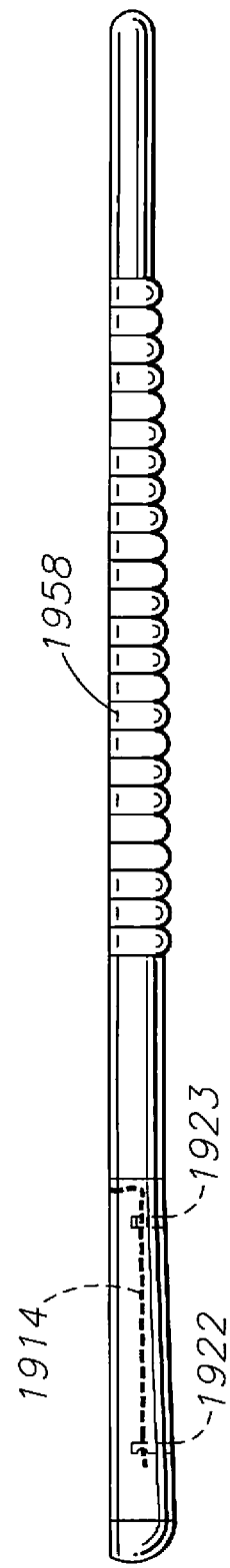
FIG. 38 is a left elevational view of a cured lure manufactured by an alternative process.
Figure 39:
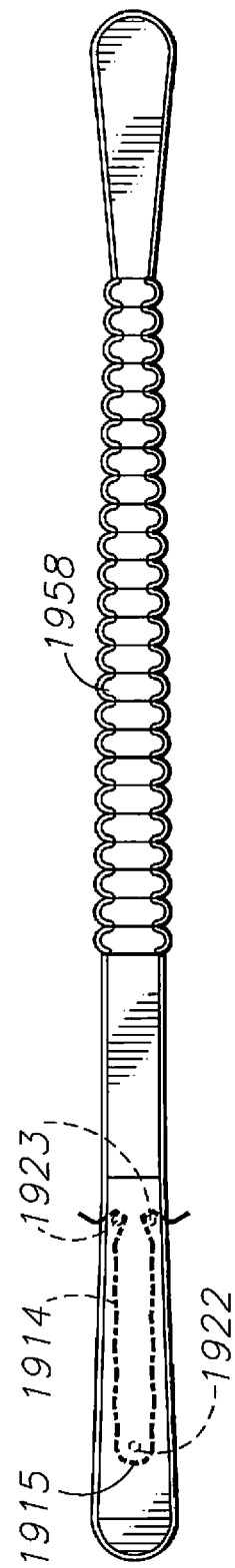
FIG. 39 is a top plan view of a cured lure manufactured by an alternative process.

Referring to FIGS. 36-38, a second alternative bait 1921 manufacturing process is shown and described where an open mold plate 1952 is provided for forming bait 1921. The open mold plate 1952 is similar to the first mold plate 1902 described above in that it is manufactured from a rigid material such as metal, steel and aluminum, and there are a plurality of adjacent object reliefs 1954 corresponding to the body of a bait 1958 to be molded. In addition to the aforementioned materials, the open mold plate 1952 may be manufactured from fiberglass resin. Head and tail pins 1910, 1912 terminate at a distal end 1925, 1927 respectively, and include notches 1911, 1913 that are located below the open mold plate 1952 face 1953. As described above, a continuous length of reinforcement 1914 is positioned taught among the pins 1910, 1912 forming a V-shape within the object relief 1954. Excess reinforcement 1914 exits the mold 1952 from the tail pins 1912 and enters the adjacent mold 1952 at the nearest-most tail pin 1912. As above, the reinforcement 1914 creates a head loop 1915 as it wraps partially around the head pin 1922. Liquid bait material 1920 is poured from a source 1956 into the object relief 1954. The liquid bait material 1920 is then heated and cooled by conventional means. The liquid bait material 1920 cures to form the bait 1958 with the reinforcement 1914 internally molded therein. The reinforcement 1914 extending between adjacent baits 1958 is cut by hand and the bait 1958 is removed from the mold 1952. The resulting bait 1958 is relatively flat on the upper surface, and has a head cavity 1922 and two tail cavities 1923 where the head and tail pins 1910, 1912 respectively were located. As above, the head cavity 1922 facilitates alignment of a fishing hook (not shown) within the head loop 1915 when attaching the bait 1958 to a hook.

It is to be understood that the invention can be embodied in various forms, and is not to be limited to the examples discussed above. Other components and configurations can be utilized in the practice of the present invention. For example, various other suitable materials, manufacturing procedures and tooling can be substituted for those described above.

Having thus described the disclosed subject matter, what is claimed as new and desired to be secured by Letters Patent is:

1. A method of manufacturing fishing lures, which comprises:
   providing a rigid first mold plate having a face and a first relief, said first relief including a rigid head pin and two rigid tail pins extending perpendicular therefrom and terminating at respective distal ends;
   providing each of said head pin and tail pins with a notch located above said first mold plate face at said distal end;

threading a reinforcement securely among said pins and at least partially in said notches;
providing a second mold plate having a face and a second relief;
providing said second relief with an injection port;
providing said second mold plate with a cutting edge adjacent to said second relief;
aligning said first relief with said second relief;
joining said first and second mold plates;
cutting said reinforcement between said first reliefs;
filling said first and second reliefs with a liquid plastic material;
forming said liquid plastic material around said reinforcement in said first and second relief;
curing said liquid plastic material to form a unitary lure body having said reinforcement embedded therein; and
removing said body from said first and second reliefs.

2. The method according to claim 1, which includes the additional step of heating and cooling said first and second molds.

3. A method of manufacturing fishing lures, which comprises:
providing a first mold plate having a face and a first relief, said first relief including a rigid head pin and two rigid tail pins extending perpendicular therefrom and terminating at respective distal ends;
providing each of said head pin and tail pins with a notch located below said face at said distal end;
threading a reinforcement securely among said pins and at least partially in said notches;
filling said first relief with a liquid plastic material;
forming said liquid plastic material around said reinforcement in said first relief;
curing said liquid plastic material to form a unitary lure body having said reinforcement embedded therein;
cutting said reinforcement between said first reliefs; and
removing said body from said first relief.

4. The method according to claim 3, which includes the additional step of heating and cooling said first mold.

* * * * *